(12) United States Patent
Spracklen

(10) Patent No.: US 10,379,887 B2
(45) Date of Patent: Aug. 13, 2019

(54) PERFORMANCE-IMBALANCE-MONITORING PROCESSOR FEATURES

(71) Applicant: VMware, Inc., Palo Alto, CA (US)

(72) Inventor: Lawrence Andrew Spracklen, Boulder Creek, CA (US)

(73) Assignee: VMware, Inc., Palo Alto, CA (US)

( * ) Notice: Subject to any disclaimer, the term of this patent is extended or adjusted under 35 U.S.C. 154(b) by 72 days.

(21) Appl. No.: 15/422,280

(22) Filed: Feb. 1, 2017

(65) Prior Publication Data

US 2017/0147369 A1     May 25, 2017

Related U.S. Application Data

(63) Continuation of application No. 13/491,444, filed on Jun. 7, 2012, now abandoned.

(51) Int. Cl.
| | |
|---|---|
| *G06F 11/30* | (2006.01) |
| *G06F 9/455* | (2018.01) |
| *G06F 11/34* | (2006.01) |
| *G06F 9/48* | (2006.01) |
| *G06F 9/52* | (2006.01) |

(52) U.S. Cl.
CPC ........ *G06F 9/45533* (2013.01); *G06F 9/4881* (2013.01); *G06F 9/52* (2013.01); *G06F 11/3024* (2013.01); *G06F 11/348* (2013.01); *G06F 11/3409* (2013.01); *G06F 11/3433* (2013.01); *G06F 2201/81* (2013.01); *G06F 2201/815* (2013.01); *G06F 2201/86* (2013.01); *G06F 2201/865* (2013.01); *G06F 2201/88* (2013.01); *G06F 2201/885* (2013.01)

(58) Field of Classification Search
CPC ..................................................... G06F 9/4553
USPC ............................................................ 714/16
See application file for complete search history.

(56) References Cited

U.S. PATENT DOCUMENTS

| | | | | |
|---|---|---|---|---|
| 5,835,705 A | * | 11/1998 | Larsen ................ | G06F 11/3409 714/47.1 |
| 6,785,886 B1 | * | 8/2004 | Lim .................... | G06F 9/45533 711/202 |
| 7,707,578 B1 | * | 4/2010 | Zedlewski ............ | G06F 9/5027 712/215 |

(Continued)

*Primary Examiner* — Kamini B Patel

(57) ABSTRACT

The current application is directed to architected hardware support within computer processors for detecting and monitoring various types of potential performance imbalances with respect to simultaneously executing hardware threads in simultaneous multi-threading ("SMT") processors and SMT-processor cores. The architected hardware support may include various types of performance-imbalance-monitoring registers that accumulate indications of performance imbalances and that can be used, by performance-monitoring software and by human analysts to detect performance-degrading conflicts between simultaneously executing hardware threads. Such conflicts can be ameliorated by changing the scheduling of virtual machines, tasks, and other computational entities, by redesigning and re-implementing all or portions of performance-limited and performance-degrading applications, by altering resource-allocation strategies, and by other means. In addition, performance imbalance detection and monitoring can be used to provide accurate, computational-throughput-based accounting in cloud-computing environments.

19 Claims, 28 Drawing Sheets

(56) References Cited

U.S. PATENT DOCUMENTS

| | | | | |
|---|---|---|---|---|
| 7,721,148 B2* | 5/2010 | Brenden | G06F 11/0793 | |
| | | | 710/15 | |
| 9,213,608 B2* | 12/2015 | Busaba | G06F 11/1479 | |
| 9,928,128 B2* | 3/2018 | Barrick | G06F 11/0724 | |
| 2006/0085591 A1* | 4/2006 | Kumar | G06F 12/0831 | |
| | | | 711/113 | |
| 2007/0130566 A1* | 6/2007 | van Rietschote | G06F 9/45533 | |
| | | | 718/1 | |
| 2010/0153542 A1* | 6/2010 | Arimilli | G06F 9/5088 | |
| | | | 709/224 | |
| 2010/0185823 A1* | 7/2010 | De | G06F 9/5077 | |
| | | | 711/153 | |
| 2010/0275216 A1* | 10/2010 | Crowell | G06F 9/526 | |
| | | | 718/106 | |
| 2011/0225592 A1* | 9/2011 | Goldin | G06F 11/3612 | |
| | | | 718/104 | |
| 2011/0271263 A1* | 11/2011 | Archer | G06F 8/45 | |
| | | | 717/149 | |
| 2011/0321057 A1* | 12/2011 | Mejdrich | G06F 9/505 | |
| | | | 718/105 | |
| 2012/0017221 A1* | 1/2012 | Hankins | G06F 11/3466 | |
| | | | 719/318 | |
| 2012/0131093 A1* | 5/2012 | Hamano | G06F 9/5088 | |
| | | | 709/203 | |
| 2012/0311544 A1* | 12/2012 | Higgs | G06F 11/3466 | |
| | | | 717/130 | |
| 2013/0332778 A1* | 12/2013 | Spracklen | G06F 11/3409 | |
| | | | 714/47.1 | |
| 2013/0332933 A1* | 12/2013 | Knauth | G06F 9/54 | |
| | | | 718/102 | |
| 2014/0019803 A1* | 1/2014 | Busaba | G06F 11/1438 | |
| | | | 714/16 | |
| 2015/0378762 A1* | 12/2015 | Saladi | H04L 41/0816 | |
| | | | 718/1 | |

* cited by examiner

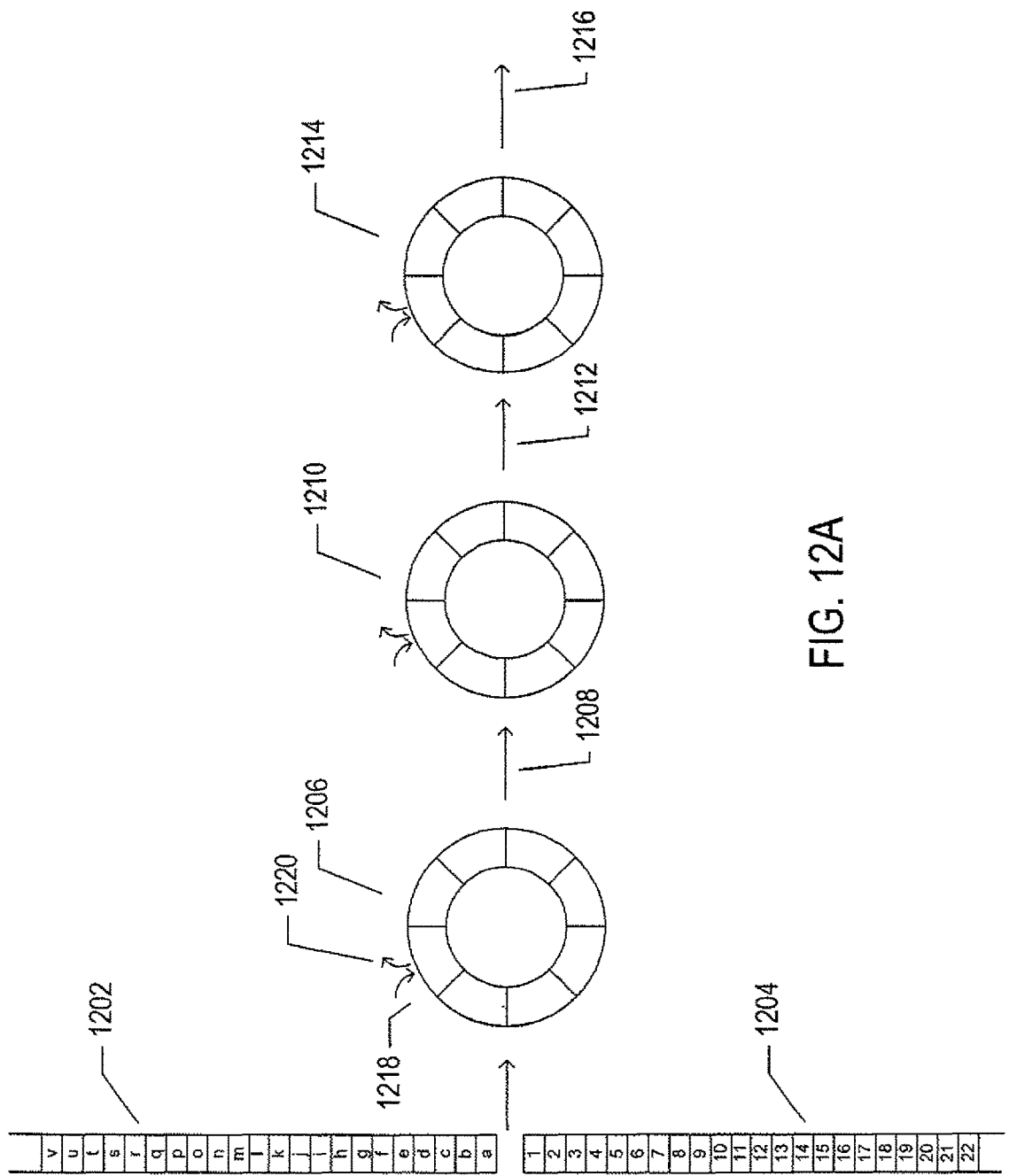

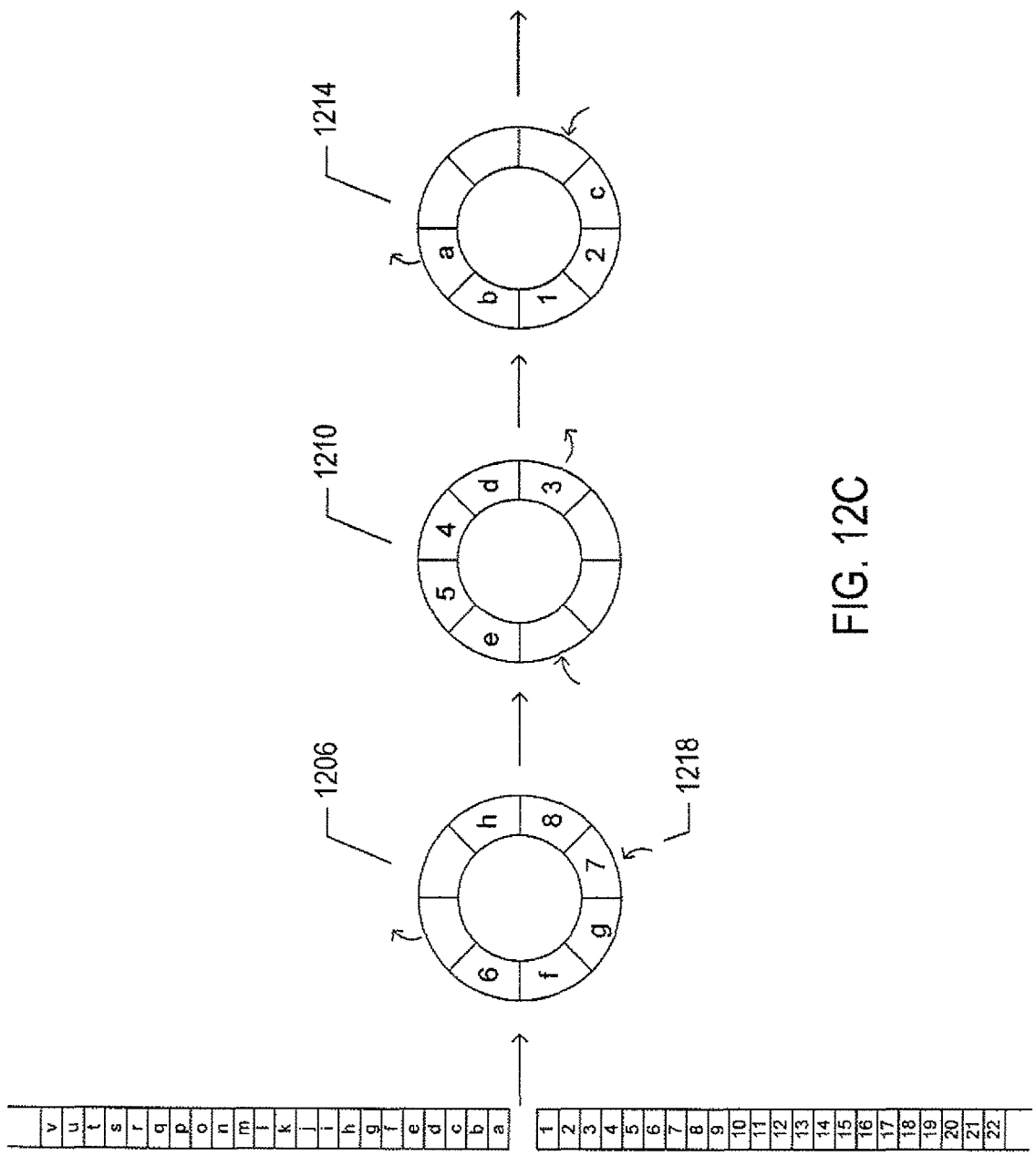

PERFORMANCE-IMBALANCE-MONITORING PROCESSOR FEATURES

CROSS-REFERENCE TO RELATED APPLICATION

This application is a continuation of application Ser. No. 13/491,444, filed Jun. 7, 2012.

TECHNICAL FIELD

The current application is directed to hardware facilities within processors that facilitate performance monitoring and accounting and, in particular, to performance-imbalance-monitoring features that store indications of potential imbalances in performance and imbalances in resource utilization by hardware threads within multi-threaded processors and processor cores.

BACKGROUND

Many modern processors include a large number of architected performance-monitoring registers that are used to count the occurrences of performance-impacting events, including resource-exhaustion-related events, and to measure computational throughput. Resource-exhaustion events include many different types of performance-impacting conditions that arise during processor operation, such as cache-line eviction events, cache misses, delays in storing data or launching operations due to full queues, and delays in accessing data and launching operations due to empty queues. In many modern processors, performance-monitoring registers accumulate counts of the number of unstalled processor cycles and the number of pipeline-executed instructions successfully retired to allow performance-monitoring programs to compute general performance metrics, including the number of instructions executed per hardware cycle ("IPC") and/or the number of processor cycles per successfully retired instruction ("CPI"), with IPC and CPI inversely related. Generally, when the IPC falls below a first threshold value and/or the CPI rises above a second threshold value, performance-monitoring components of virtual-machine monitors ("VMMs"), operating systems ("OSs"), and various higher-level performance-analysis systems may invoke a variety of different performance-monitoring analyses to attempt to determine likely causes of the observed decreases in computational throughput to take or suggest various types of ameliorative procedures, such as alternatively scheduling execution of virtual machines ("VMs") or tasks, flagging particular tasks for redesign and reimplementation for performance optimization, reallocating computational and data-storage resources among VMs and tasks, and other types of ameliorative procedures. These analyses generally consider the many different types of accumulated counts and metrics provided by various additional performance-monitoring registers, such as performance-monitoring registers that accumulate counts of the number of cache misses, execution-pipeline stalls, full-queue and empty-queue events, and other types of potentially performance-degrading events. In addition, performance analysis may involve a variety of different types of data collected through software instrumentation, operating-system performance monitoring, VMM performance monitoring, and other types of performance-related data.

Both computing hardware and software have evolved at rapid rates over the past 50 years. Early computer systems generally included a single, relatively slow Von Neumann-type processor implemented from many different discrete electronic components distributed across multiple printed circuit boards. Currently, even modestly priced personal computers ("PCs") contain extremely complex, fast, and powerful multi-core processors with simultaneous multi-threading cores ("SMT") integrated within single integrated-circuits. While early computers had primitive control programs that provided rudimentary execution environments for executing single programs, from start to finish, in batch-mode processing, even relatively low-end workstations and servers may currently feature virtual machine monitors to provide execution environments for multiple guest operating systems, each, in turn, providing execution environments for concurrent or simultaneous execution of large numbers of multi-threaded processes. These complex hardware and software computing systems represent numerous performance monitoring and accounting challenges that current performance-monitoring hardware features of modern processors do not fully address.

SUMMARY

The current application is directed to architected hardware support within computer processors for detecting and monitoring various types of potential performance imbalances with respect to simultaneously executing hardware threads in simultaneous multi-threading ("SMT") processors and SMT-processor cores. The architected hardware support may include various types of performance-imbalance-monitoring registers that accumulate indications of performance imbalances and that can be used, by performance-monitoring software and by human analysts to detect performance-degrading conflicts between simultaneously executing hardware threads. Such conflicts can be ameliorated by changing the scheduling of virtual machines, tasks, and other computational entities, by redesigning and re-implementing all or portions of performance-limited and performance-degrading applications, by altering resource-allocation strategies, and by other means. In addition, performance imbalance detection and monitoring can be used to provide accurate, computational-throughput-based accounting in cloud-computing environments.

BRIEF DESCRIPTION OF THE DRAWINGS

FIGS. 12A-G illustrate performance impacts due to resource exhaustion.

DETAILED DESCRIPTION

The current application discloses a new type of performance-imbalance-monitoring register included as an architected feature of a simultaneous multi-threading ("SMT") processor or SMT-processor core. Performance-imbalance-monitoring registers allow a virtual-machine monitor, operating system, and/or various types of performance-monitoring software applications to detect performance-degrading conflicts between simultaneously executing hardware threads within an SMT processor or SMT-processor core. Performance-degrading conflicts can then be ameliorated by any of many different techniques. A virtual-machine monitor or operating system can, as one example, alter the assignments of virtual machines, tasks, and other computational entities or threads within SMT processors and SMT-processor cores in order to create or eliminate performance-degrading conflicts. Alternatively, problematic applications, tasks, virtual machines, or other computational entities may either be scheduled for sole execution within a processor core and/or may be identified for redesign and/or reimplementation for optimized performance. In certain cases, computational resources may be reallocated, the priorities associated with various computational entities may be adjusted, and other types of ameliorative steps may be taken in order to decrease or eliminate performance-degrading conflicts. In addition, performance-imbalance-monitoring registers may provide information to allow a cloud-computing facility to more accurately bill clients for computational throughput, rather than billing clients based on clock-time intervals during which their applications are run within the cloud-computing facility.

Figure 1:
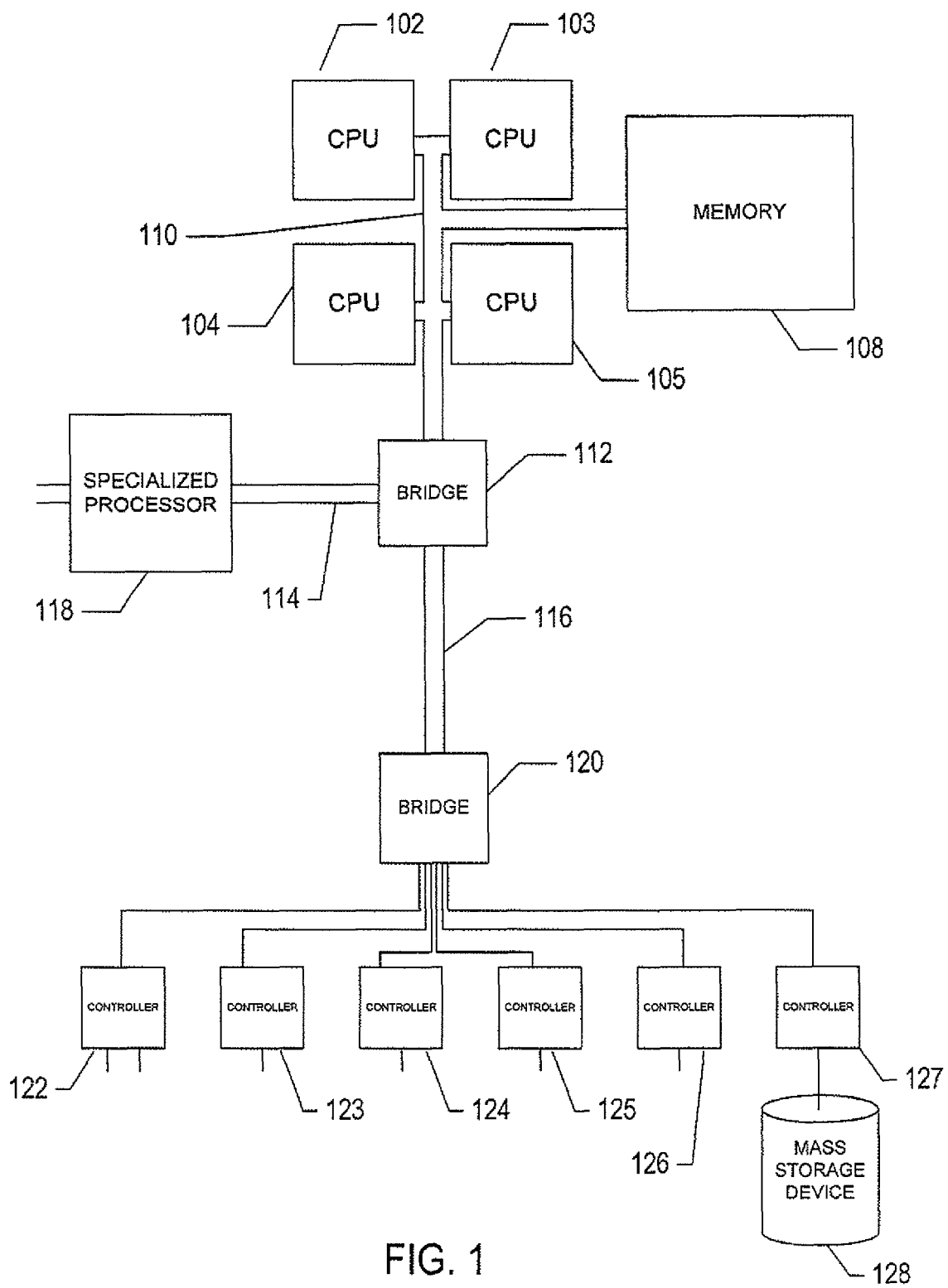
FIG. 1 provides a general architectural diagram for various types of computers.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources.

Of course, there are many different types of computer-system architectures that differ from one another in the number and organization of different memories, including cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
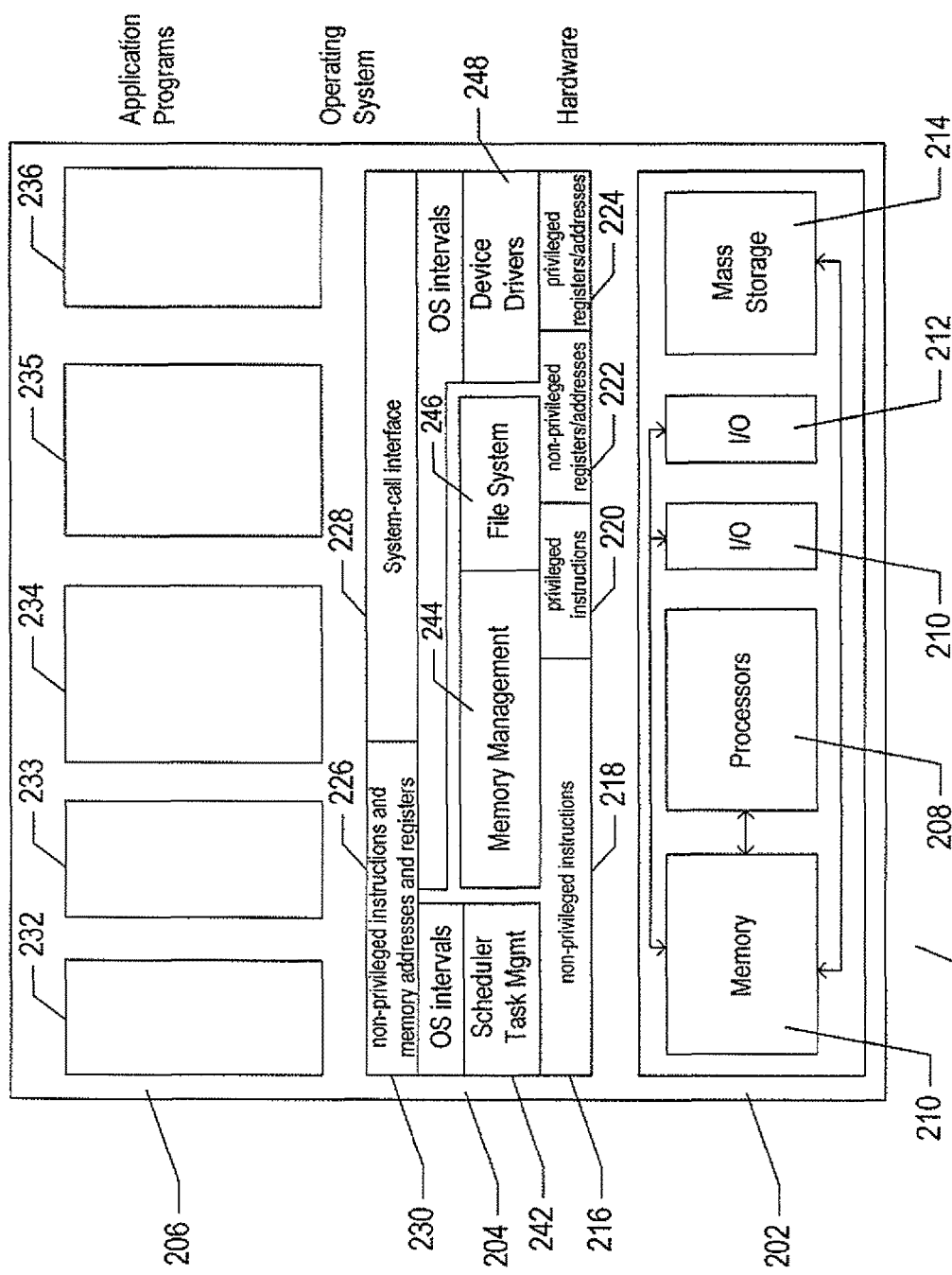
FIG. 2 illustrates generalized hardware and software components of a general-purpose computer system, such as a general-purpose computer system having an architecture similar to that shown in FIG. 1.

FIG. 2 illustrates generalized hardware and software components of a general-purpose computer system, such as a general-purpose computer system having an architecture similar to that shown in FIG. 1. The computer system 200 is often considered to include three fundamental layers: (1) a hardware layer or level 202; (2) an operating-system layer or level 204; and (3) an application-program layer or level 206. The hardware layer 202 includes one or more processors 208, system memory 210, various different types of input-output ("I/O") devices 210 and 212, and mass-storage devices 214. Of course, the hardware level also includes many other components, including power supplies, internal communications links and busses, specialized integrated circuits, many different types of processor-controlled or microprocessor-controlled peripheral devices and controllers, and many other components. The operating system 204 interfaces to the hardware level 202 through a low-level operating system and hardware interface 216 generally comprising a set of non-privileged computer instructions 218, a set of privileged computer instructions 220, a set of non-privileged registers and memory addresses 222, and a set of privileged registers and memory addresses 224. In general, the operating system exposes non-privileged instructions, non-privileged registers, and non-privileged memory addresses 226 and a system-call interface 228 as an operating-system interface 230 to application programs 232-236 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 242, memory management 244, a file system 246, device drivers 248, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 236 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 3:
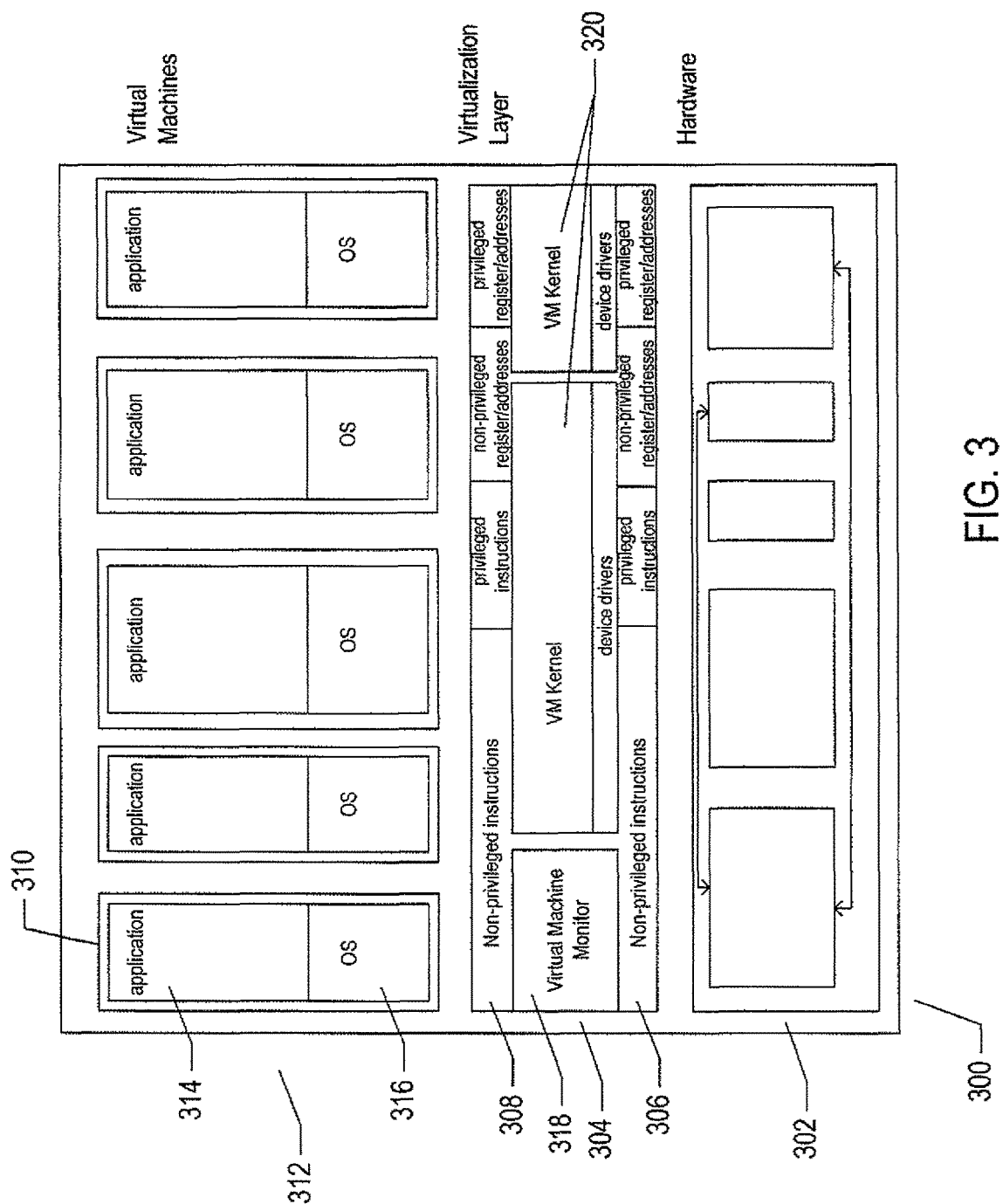
FIG. 3 illustrates one type of virtual machine and virtual-machine execution environment.

For all of these reasons, a higher level of abstraction, referred to as the "virtual machine," has been developed and evolved to further abstract computer hardware in order to address many difficulties and challenges associated with traditional computing systems, including the compatibility issues discussed above. FIG. 3 illustrates one type of virtual machine and virtual-machine execution environment. FIG. 3 uses the same illustration conventions as used in FIG. 2. In particular, the computer system 300 in FIG. 3 includes the same hardware layer 302 as the hardware layer 202 shown in FIG. 2. However, rather than providing an operating system layer directly above the hardware layer, as in FIG. 2, the virtualized computing environment illustrated in FIG. 3 features a virtualization layer 304 that interfaces through a virtualization-layer/hardware-layer interface 306, equivalent to interface 216 in FIG. 2, to the hardware. The virtualization layer provides a hardware-like interface 308 to a number of virtual machines, such as virtual machine 310, executing above the virtualization layer in a virtual-machine layer 312. Each virtual machine includes one or more application programs or other higher-level computational entities packaged together with an operating system, such as application 314 and operating system 316 packaged together within virtual machine 310. Each virtual machine is thus equivalent to the operating-system layer 204 and application-program layer 206 in the general-purpose computer system shown in FIG. 2. Each operating system within a virtual machine interfaces to the virtualization-layer interface 308 rather than to the actual hardware interface 306. The virtualization layer partitions hardware resources into abstract virtual-hardware layers to which each operating system within a virtual machine interfaces. The operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 308 may differ for different operating systems. For example, the virtualization layer is generally able to provide virtual hardware interfaces for a variety of different types of computer hardware. This allows, as one example, a virtual machine that includes an operating system designed for a particular computer architecture to run on hardware of a different architecture. The number of virtual machines need not be equal to the number of physical processors or even a multiple of the number of processors. The virtualization layer includes a virtual-machine-monitor ("VMM") module 318 that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the operating system within a virtual machine accesses virtual privileged instructions, virtual privileged registers, and virtual privileged memory through the virtualization-layer interface 308, the accesses result in execution of virtualization-layer code to simulate or emulate the privileged resources. The virtualization layer additionally includes a kernel module 320 that manages memory, communications, and data-storage machine resources on behalf of executing virtual machines. The kernel, for example, maintains shadow page tables on each virtual machine so that hardware-level virtual-memory facilities can be used to process memory accesses. The kernel additionally includes routines that implement virtual communications and data-storage devices as well as device drivers that directly control the operation of underlying hardware communications and data-storage devices. Similarly, the kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

Figure 4:
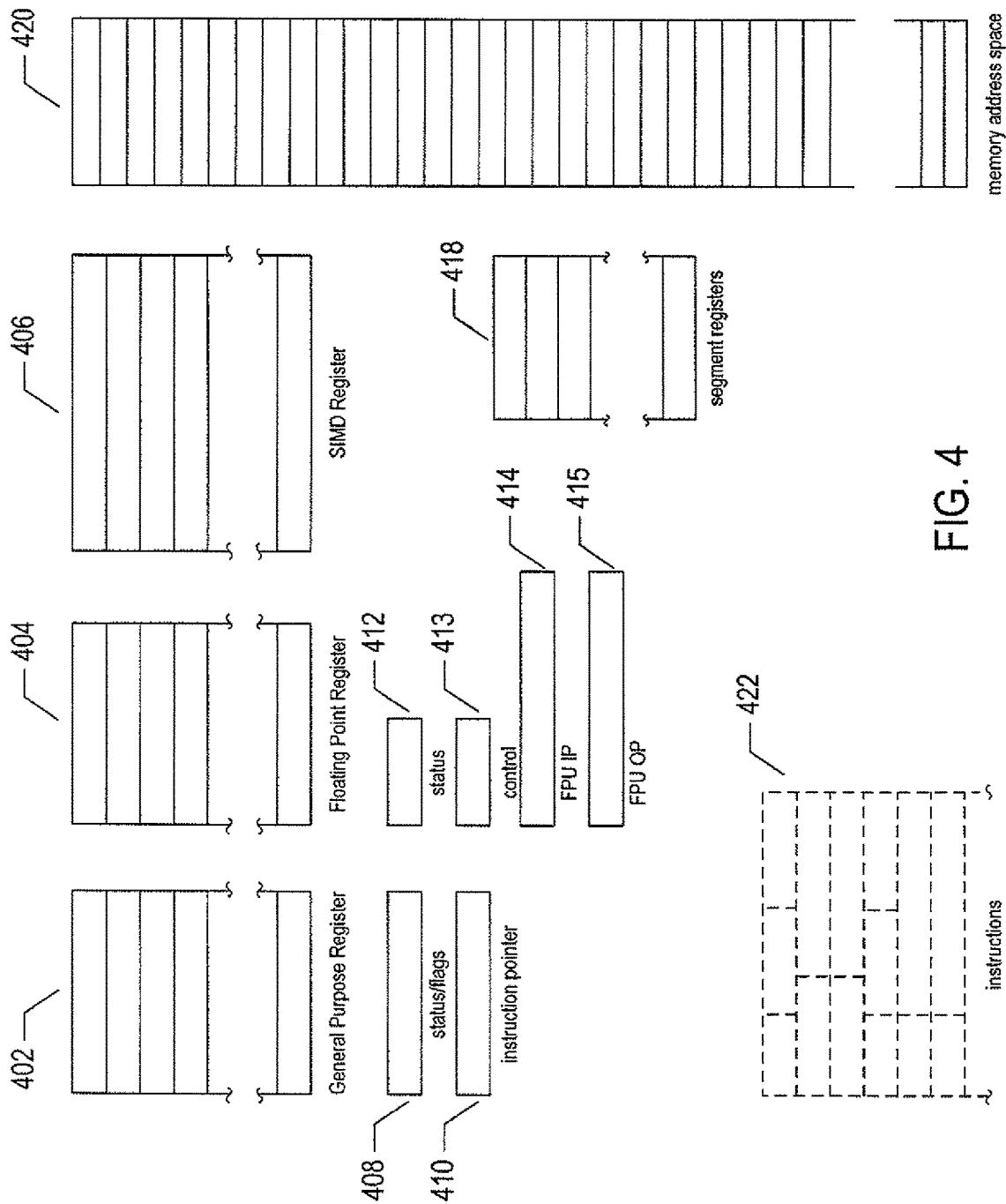
FIG. 4 illustrates an instruction-set architecture ("ISA") provided by a modern processor as the low-level execution environment for binary code and assembler code.

FIG. 4 illustrates an instruction-set architecture ("ISA") provided by a modern processor as the low-level execution environment for binary code and assembler code. The ISA commonly includes a set of general-purpose registers 402, a set of floating-point registers 404, a set of single-instruction-multiple-data ("SIMD") registers 406, a status/flags register 408, an instruction pointer 410, special status 412, control 413, and instruction-pointer 414 and operand 415 registers for floating-point instruction execution, segment registers 418 for segment-based addressing, a linear virtual-memory address space 420, and the definitions and specifications of the various types of instructions that can be executed by the processor 422. The length, in bits, of the various registers is generally implementation dependent, often related to the fundamental data unit that is manipulated by the processor when executing instructions, such as a 16-bit, 32-bit, or 64-bit word and/or 64-bit or 128-bit floating-point words. When a computational entity is instantiated within a computer system, the values stored in each of the registers and in the virtual memory-address space together comprise the machine state, or architecture state, for the computational entity. While the ISA represents a level of abstraction above the actual hardware features and hardware resources of a processor, the abstraction is generally not too far removed from the physical hardware. As one example, a processor may maintain a somewhat larger register file that includes a greater number of registers than the set of general-purpose registers provided by the ISA to each computational entity. ISA registers are mapped by processor logic, often in cooperation with an operating system and/or virtual-machine monitor, to registers within the register file, and the contents of the registers within the register file may, in turn, be stored to memory and retrieved from memory, as needed, in order to provide temporal multiplexing of computational-entity execution.

Figure 5:
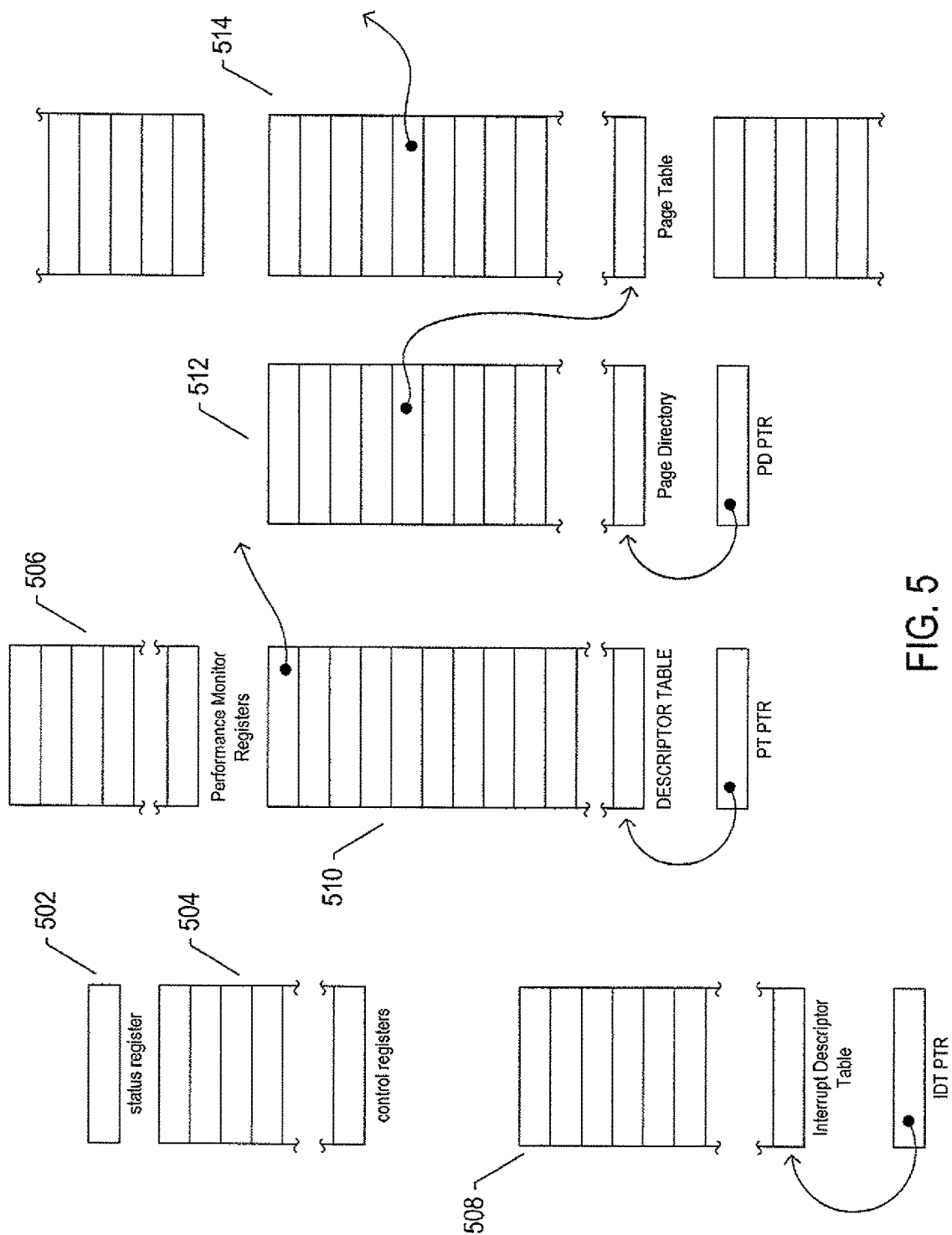
FIG. 5 illustrates an additional abstraction of processor features and resources used by virtual-machine monitors, operating systems, and other privileged control programs.

FIG. 5 illustrates an additional abstraction of processor features and resources used by virtual-machine monitors, operating systems, and other privileged control programs. These processor features, or hardware resources, can generally be accessed only by control programs operating at higher levels than the privilege level at which application programs execute. These system resources include an additional status register 502, a set of additional control registers 504, a set of performance-monitoring registers 506, an interrupt-descriptor table 508 that stores descriptions of entry points for interrupt handlers, the descriptions including references to memory descriptors stored in a descriptor table 510. The memory descriptors stored in the descriptor table may be accessed through references stored in the interrupt-descriptor table, segment selectors included in virtual-memory addresses, or special task-state segment selectors used by an operating system to store the architectural state of a currently executing process. Segment references are essentially pointers to the beginning of virtual-memory segments. Virtual-memory addresses are translated by hardware virtual-memory-address translation features that ultimately depend on a page directory 512 that contains entries pointing to page tables, such as page table 514, each of which, in turn, contains a physical memory address of a virtual-memory page.

Figure 6:
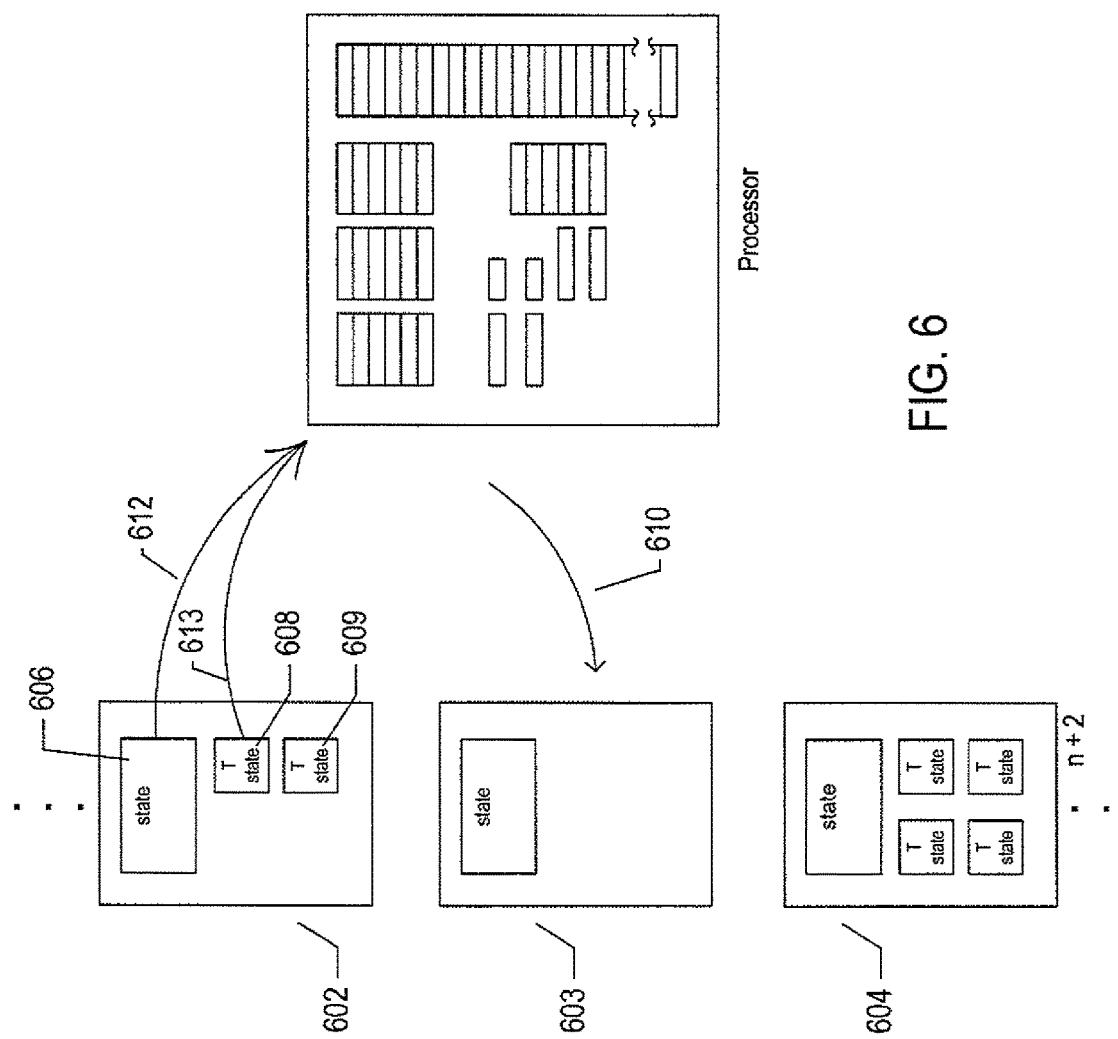
FIG. 6 illustrates a general technique for temporal multiplexing used by many operating systems.

In many modern operating systems, the operating system provides an execution environment for concurrent execution of a large number of processes, each corresponding to an executing application program, on one or a relatively small number of hardware processors by temporal multiplexing of process execution. FIG. 6 illustrates a general technique for temporal multiplexing used by many operating systems. The operating system maintains a linked list of process-context data structures, such as data structure 602-604, in memory. Each process-context data structure stores state information for the process, such as state information 606 in data structure 602, along with additional state for concurrently executing threads, such as thread states 608-609 in data structure 602. The operating system generally provides blocks of time or blocks of execution cycles to the concurrently executing processes according to a process-execution-scheduling strategy, such as round-robin scheduling or various types of more complex scheduling strategies, many employing pre-emption of currently executing processes. Dormant processes are made executable by a context switch, as indicated in FIG. 6, during which a portion of the architectural state of a currently executing process is stored into an associated process-context data structure for the process, as represented by arrow 610 in FIG. 6, and the stored portion of the architectural state of a dormant process is loaded into processor registers, as indicated by arrows 612-613 in FIG. 6. In general, a process is allowed to execute for some predetermined length of time or until the process is stalled or blocked, waiting for the availability of data or the occurrence of an event. When either the allotted amount of time or number of processor cycles have been used or when the process is stalled, a portion of the architectural state of the process and any concurrent threads executing within the context of the process are stored in the associated process-context data structure, freeing up the hardware resources mapped to the process in order to allow execution of a different process. In the operating-system context, threads are essentially lightweight processes with minimal thread-specific state. In many cases, each thread may have a thread-specific set of registers, but all the threads within a particular process context generally share the virtual-memory address space for the process. Thus, in general, the threads represent different execution instantiations of a particular application corresponding to the process within which the threads execute. One example of a multi-threaded application is a server application in which a new execution thread is launched to handle each incoming request. In general, an operating system may provide for simultaneous execution of as many threads as there are logical processors in the computing system controlled by the operating system. Until recently, the smallest granularity hardware resource for execution of an execution thread was an actual hardware processor. As discussed further below, in certain more recent and currently available processors, the smallest-granularity hardware resource supporting execution of a process or thread is a logical processor that corresponds to a hardware thread within an SMT processor or SMT-processor core.

Figure 7:
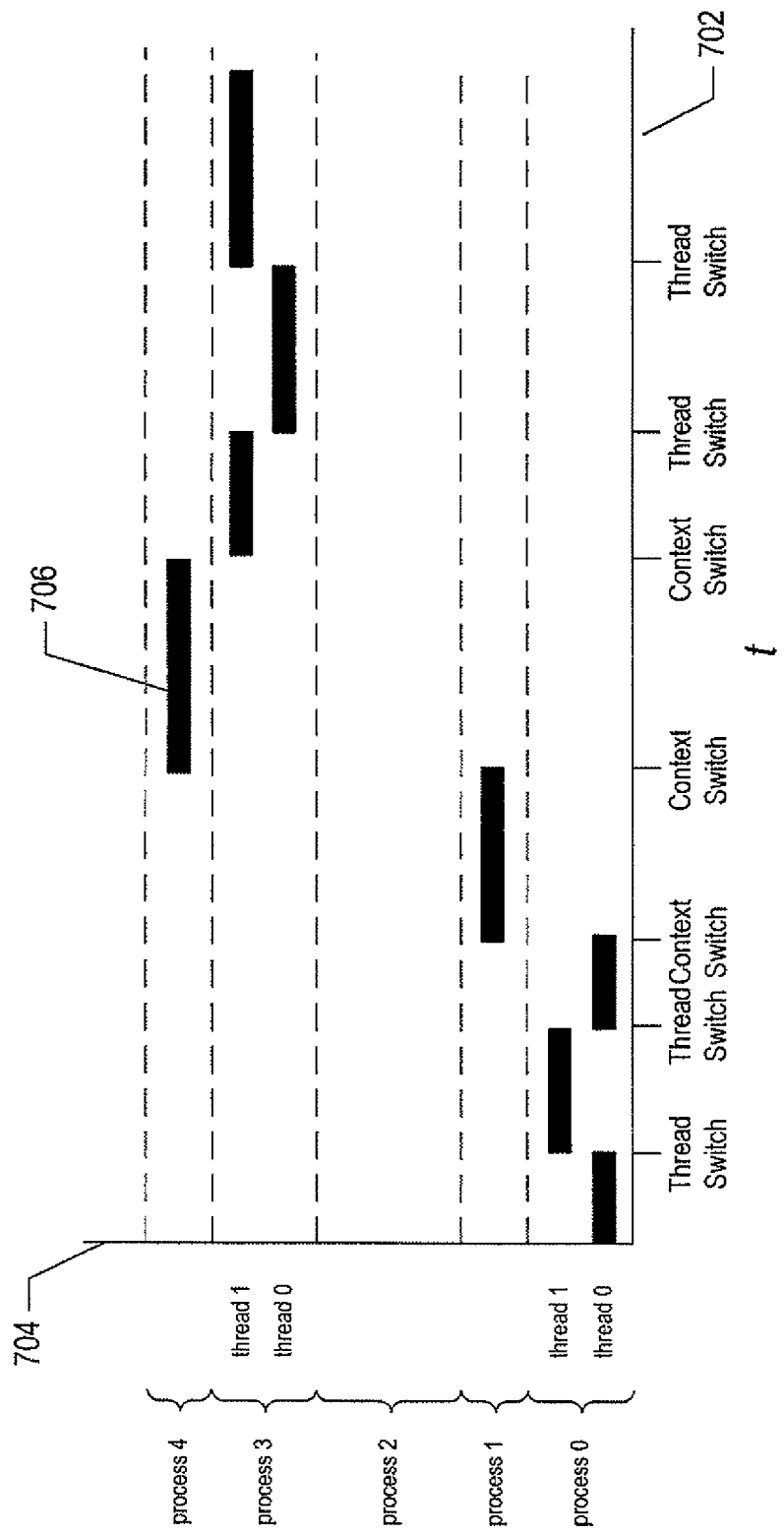
FIG. 7 illustrates temporal multiplexing of process and thread execution by an operating system with respect to a single processor or logical processor.

FIG. 7 illustrates temporal multiplexing of process and thread execution by an operating system with respect to a single processor or logical processor. In FIG. 7, the horizontal axis 702 represents time and the vertical axis 704 represents the various processes and threads concurrently executing on the processor or logical processor. The shaded, horizontal bars, such as shaded horizontal bar 706, represent the period of time during which a particular process or thread executes on the processor or logical processor. As indicated along the horizontal axis, the end of one shaded horizontal bar aligns with the beginning of a different shaded horizontal bar and coincides with either a thread switch or context switch that allows execution to be transferred from one thread or process to another thread or process. The time required for the operating system to carry out a thread switch or context switch is not shown in FIG. 7, and is generally relatively insignificant in comparison to the amount of time devoted to execution of application instructions and system routines unrelated to context switching.

SMT processors, a relatively recent development in hardware architecture, provide for simultaneous execution of multiple hardware execution threads. SMT processors or SMT-processor cores provide for simultaneous hardware-execution threads by duplicating a certain portion of the hardware resources, including certain of the ISA registers, within a processor or processor core, by partitioning other of the hardware resources between hardware-execution threads, and by allowing hardware-execution threads to compete for, and share, other of the hardware resources. Modern processors are highly pipelined, and SMT processors or SMT-processor cores can often achieve much higher overall computational throughput because the various processor resources that would otherwise be idled during execution of the instructions corresponding to one hardware thread can be used by other, simultaneously executing hardware threads. Operating system threads, discussed earlier with reference to FIGS. 6 and 7, and hardware threads are conceptually similar, but differ dramatically in implementation and operational characteristics. As discussed above with reference to FIG. 7, operating-system-provided threads are products of temporal multiplexing by the operating system of hardware resources, and the temporal multiplexing involves operating-system-executed context switches. By contrast, hardware threads simultaneously execute within a processor or processor core, without hardware-thread context switches. Complex pipelined architecture of modern processors allows many different instructions to be executed in parallel, and an SMT processor or SMT-processor core allows instructions corresponding to two or more different hardware threads to be simultaneously executed.

Figure 8:
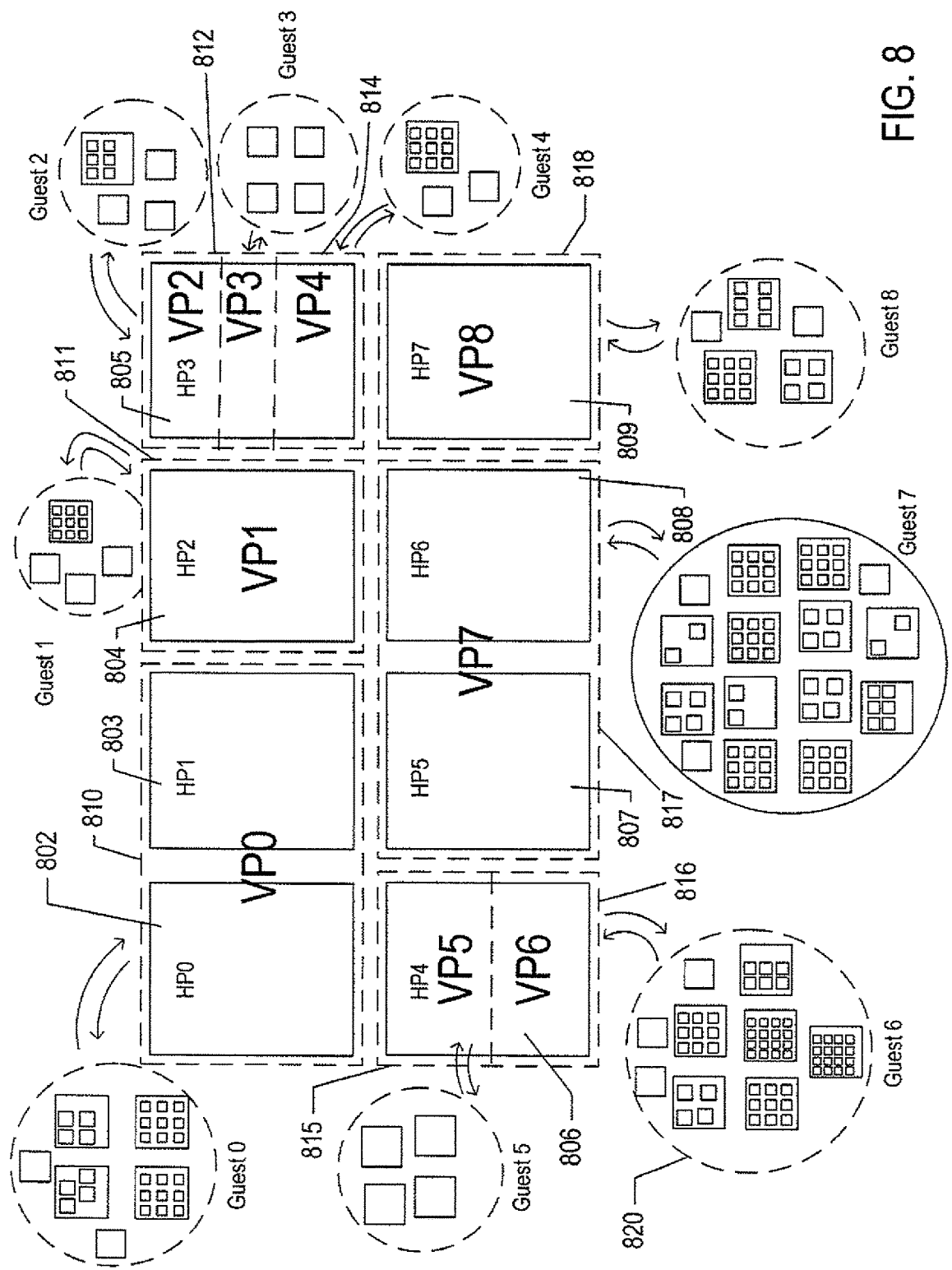
FIG. 8 illustrates an example of a complex execution environment provided by a multi-processor-based computer system in which many different processes and threads are concurrently and simultaneously executed.

FIG. 8 illustrates an example of a complex execution environment provided by a multi-processor-based computer system in which many different processes and threads are concurrently and simultaneously executed. The computer system illustrated in FIG. 8 includes eight SMT processors or processor cores HP0, HP1, . . . , HP7 802-809, each illustrated as rectangles with solid-line boundaries. A VMM may create a virtual-processor abstraction, mapping VMM virtual processors to hardware processing resources. In the example shown in FIG. 8, a VMM maps, as one example, virtual processor VP0 810 to the pair of hardware processors 802 and 803, with the virtual processor indicated by a rectangle with dashed-line boundaries enclosing the two hardware processors. Similarly, the VMM maps virtual processor VP1 811 to hardware processor 804, virtual processors VP2, VP3, and VP4 812-814 to hardware processor 805, virtual processors VP5 815 and VP6 816 to hardware processor 806, virtual processor VP7 817 to hardware processors 807 and 808, and virtual processor VP8 818 to hardware processor 809. In the case of SMT processors, the VMM may map, as one example, a virtual processor to each hardware thread provided by an SMT processor. For example, in the example shown in FIG. 8, virtual processors VP5 and VP6, 815 and 816 respectively, may each be mapped to a single hardware thread provided by SMT processor or SMT-processor core 806. The VMM may execute a VM, including a guest operating system and one or more application programs, on each virtual processor. The guest operating system within each VM may provide an execution environment for the concurrent and/or simultaneous execution of many different processes and/or execution threads. In FIG. 8, the processes and threads executing within process contexts within the execution environment provided by a guest operating system are shown inside dashed circles, such as dashed circle 820. Thus, a modern computer system may provide multiple, hierarchically ordered execution environments that, in turn, provide for simultaneous and/or concurrent execution of many different processes and execution threads executing within process contexts.

With the introduction of SMT processors and SMT-processor cores, the level of complexity has additionally increased. Monitoring computational throughput provided to each virtual machine in these complex environments is non-trivial, and the performance-monitoring registers and other hardware facilities provided by modern processors are generally inadequate for determining the computational throughputs for VMs mapped to hardware threads. Determination of computational throughputs for VMs managed by VMM is useful in scheduling VM execution and optimizing execution schedules as well as in accounting operations used to charge clients of large computer systems, such as cloud-computing facilities, based on the processor cycles used by the clients or on some type of measured computational throughput, often related to the rate of instruction execution provided to the clients. As further discussed below, in the case that clients are billed based on clock time during which their applications run within a cloud-computing facility, and when their applications experience performance imbalances that result in frequent stalling on exhausted resources with respect to one or VMs of another client simultaneously executing on hardware threads within an SMT processor or SMT-processor core shared by multiple clients, accounting only by clock time or even by instruction throughput may result in less-than-fair billing practices. A fairer accounting procedure would be to bill clients based on productive execution of instructions. However, as discussed further below, current hardware performance-monitoring facilities are inadequate to detect many types of performance imbalance.

Figure 9:
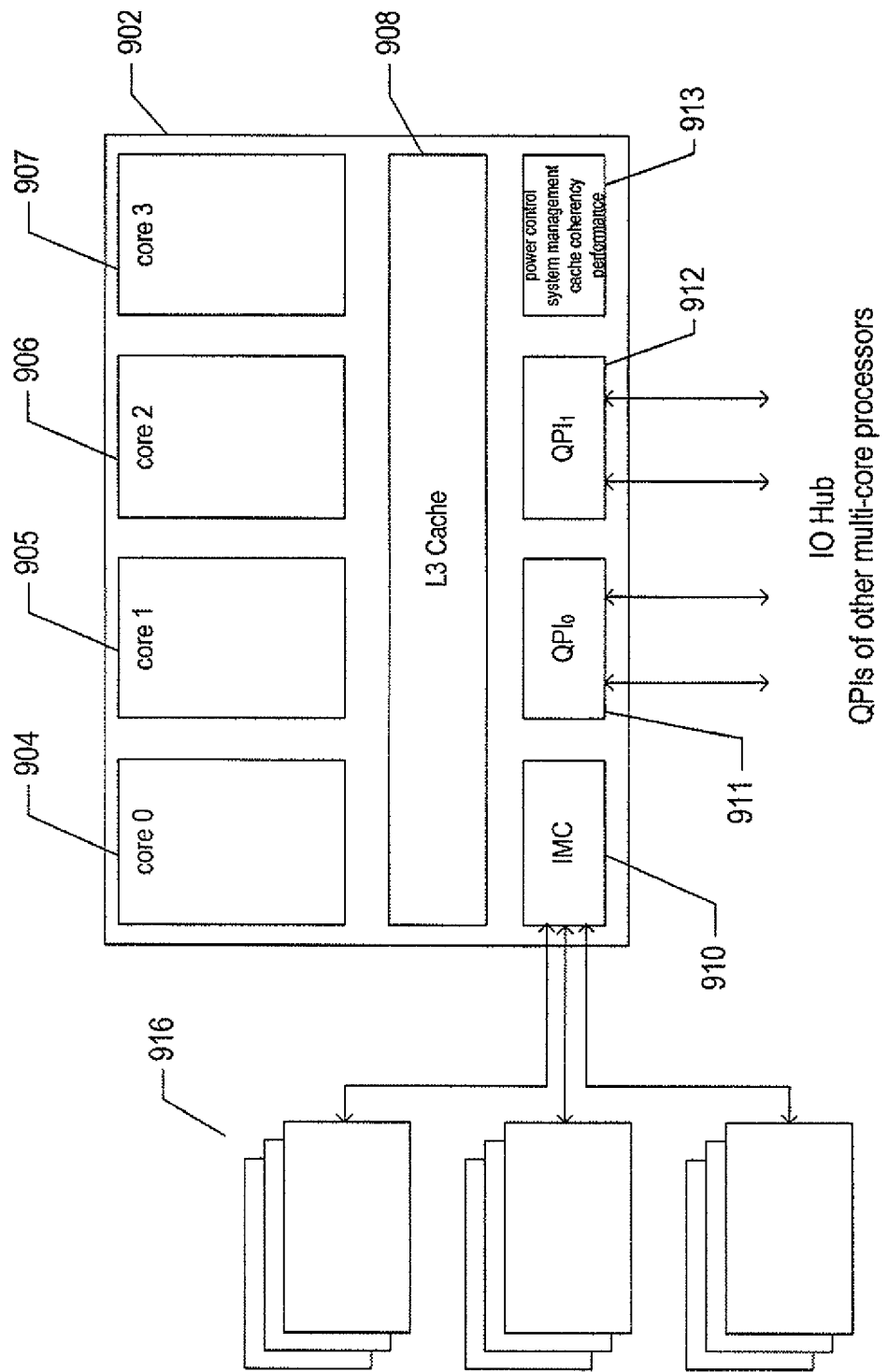
FIG. 9 illustrates an example multi-core processor.

FIG. 9 illustrates an example multi-core processor. The multi-core processor 902 includes four processor cores 904-907, a level-3 cache 908 shared by the four cores 904-907, and additional interconnect and management components 910-913 also shared among the four processor cores 904-907. Integrated memory controller ("IMC") 910 manages data transfer between multiple banks of dynamic random access memory ("DRAM") 916 and the level-3 cache ("L3 cache") 908. Two interconnect ports 911 and 912 provide data transfer between the multi-core processor 902 and an IO hub and other multi-core processors. A final, shared component 913 includes power-control functionality, system-management functionality, cache-coherency logic, and performance-monitoring logic.

Each core in a multi-core processor is essentially a discrete, separate processor that is fabricated, along with all the other cores in a multi-core processor, within a single integrated circuit. As discussed below, each core includes multiple instruction-execution pipelines and internal L1 caches. In some cases, each core also contains an L2 cache, while, in other cases, pairs of cores may share an L2 cache. As discussed further, below, SMT-processor cores provide for simultaneous execution of multiple hardware threads. Thus, a multi-SMT-core processor containing four SMT-processors that each supports simultaneous execution of two hardware threads can be viewed as containing eight logical processors, each logical processor corresponding to a single hardware thread.

The memory caches, such as the L3 cache 908 and the multi-core processor shown in FIG. 9 is generally SRAM memory, which is much faster but also more complex and expensive than DRAM memory. The caches are hierarchically organized within a processor. The processor attempts to fetch instructions and data, during execution, from the smallest, highest-speed L1 cache. When the instruction or data value cannot be found in the L1 cache, the processor attempts to find the instruction or data in the L2 cache. When the instruction or data is resident in the L2 cache, the instruction or data is copied from the L2 cache into the L1 cache. When the L1 cache is full, instruction or data within the L1 cache is evicted, or overwritten, by the instruction or data moved from the L2 cache to the L1 cache. When the data or instruction is not resident within the L2 cache, the processor attempts to access the data or instruction in the L3 cache, and when the data or instruction is not present in the L3 cache, the data or instruction is fetched from DRAM system memory. Ultimately, data and instruction are generally transferred from a mass-storage device to the DRAM memory. As with the L1 cache, when intermediate caches are full, eviction of an already-resident instruction or data generally occurs in order to copy data from a downstream cache into an upstream cache.

Figure 10:
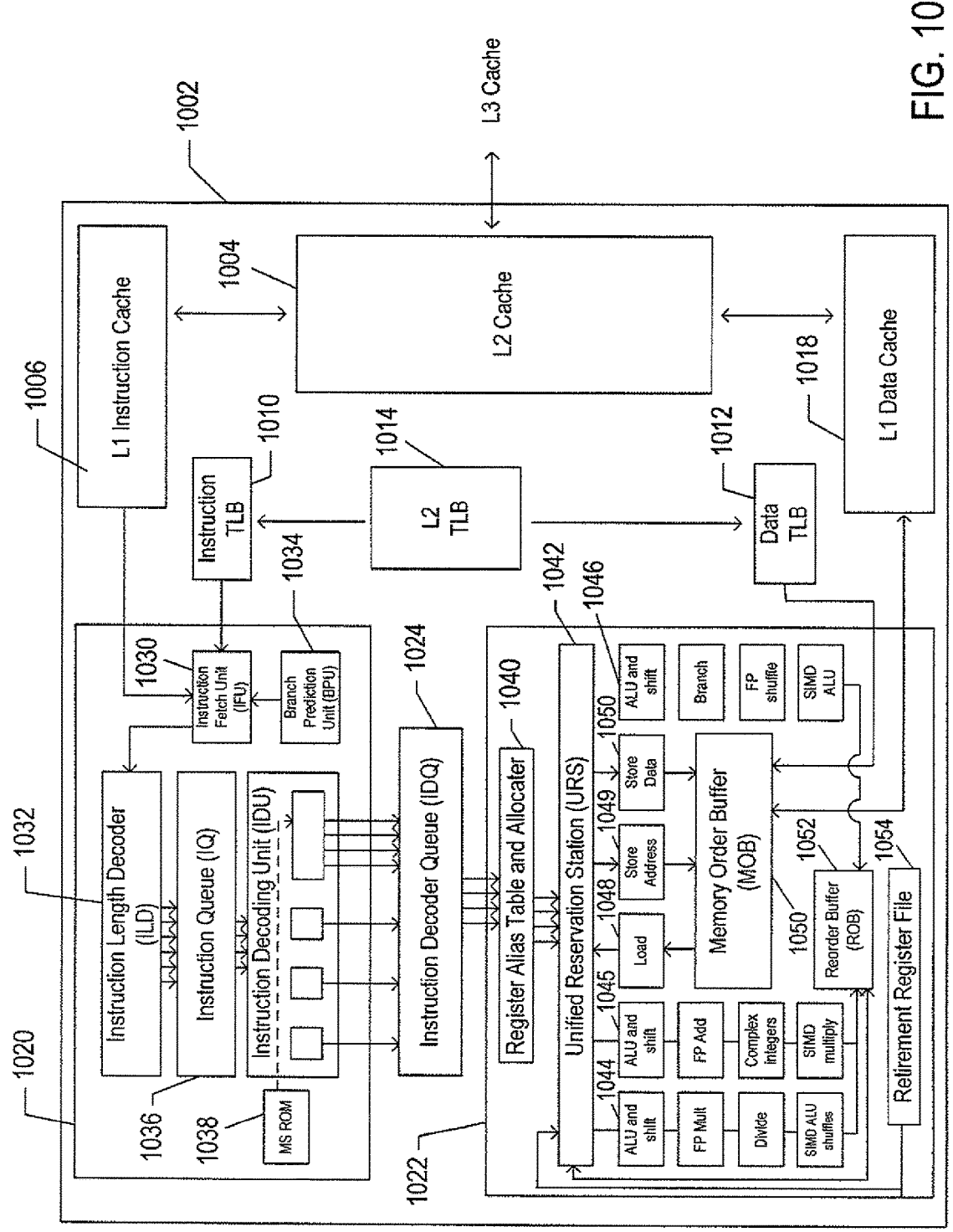
FIG. 10 illustrates the components of an example processor core.

FIG. 10 illustrates the components of an example processor core. As with the descriptions of the ISA and system registers, with reference to FIGS. 4 and 5, and with the description of the multi-core processor, with reference to FIG. 9, the processor core illustrated in FIG. 10 is intended as a high-level, relatively generic representation of a processor core. Many different types of multi-core processors feature different types of cores that provide different ISAs and different constellations of system registers. The different types of multi-core processors may use quite different types of data structures and logic for mapping virtual-memory addresses to physical addresses. Different types of multi-core processors may provide different numbers of general-purpose registers, different numbers of floating-point registers, and vastly different internal execution-pipeline structures and computational facilities.

The processor core 1002 illustrated in FIG. 10 includes an L2 cache 1004 connected to an L3 cache (908 in FIG. 9) shared by other processor cores as well as to an L1 instruction cache 1006 and an L1 data cache 1008. The processor core also includes a first-level instruction translation-lookaside buffer ("TLB") 1010, a first-level data TLB 1012, and a second-level, universal TLB 1014. These TLBs store virtual-memory translations for the virtual-memory addresses of instructions and data stored in the various levels of caches, including the L1 instruction cache, the L1 data cache, and L2 cache. When a TLB entry exists for a particular virtual-memory address, accessing the contents of the physical memory address corresponding to the virtual-memory address is far more computationally efficient than computing the physical-memory address using the previously described page directory and page tables.

The processor core 1002 includes a front-end in-order functional block 1020 and a back-end out-of-order-execution engine 1022. The front-end block 1020 reads instructions from the memory hierarchy and decodes the instructions into simpler microinstructions which are stored in the instruction decoder queue ("IDQ") 1024. The microinstructions are read from the IDQ by the execution engine 1022 and executed in various parallel execution pipelines within the execution engine. The front-end functional block 1020 include an instruction fetch unit ("IFU") 1030 that fetches 16 bytes of aligned instruction bytes, on each clock cycle, from the L1 instruction cache 1006 and delivers the 16 bytes of aligned instruction bytes to the instruction length decoder ("ILD") 1032. The IFU may fetch instructions corresponding to a particular branch of code following a branch instruction before the branch instruction is executed and, therefore, before it is known with certainty that the particular branch of code will be selected for execution by the branch instruction. Selection of code branches from which to select instructions prior to execution of a controlling branch instruction is made by a branch prediction unit 1034. The ILD 1032 processes the 16 bytes of aligned instruction bytes provided by the instruction fetch unit 1030 on each clock cycle in order to determine lengths of the instructions included in the 16 bytes of instructions and may undertake partial decoding of the individual instructions, providing up to six partially processed instructions per clock cycle to the instruction queue ("IQ") 1036. The instruction decoding unit ("IDU") reads instructions from the IQ and decodes the instructions into microinstructions which the IDU writes to the IDQ 1024. For certain complex instructions, the IDU fetches multiple corresponding microinstructions from the MS ROM 1038.

The back-end out-of-order-execution engine 1022 includes a register alias table and allocator 1040 that allocates execution-engine resources to microinstructions and uses register renaming to allow instructions that use a common register to be executed in parallel. The register alias table and allocator component 1040 then places the microinstructions, following register renaming and resource allocation, into the unified reservation station ("URS") 1042 for dispatching to the initial execution functional units 1044-1046 and 1048-1050 of six parallel execution pipelines. Microinstructions remain in the URS until all source operands have been obtained for the microinstructions. The parallel execution pipelines include three pipelines for execution of logic and arithmetic instructions, with initial functional units 1044-1046, a pipeline for loading operands from memory, with initial functional unit 1048, and two pipelines with initial functional units 1049-1050, for storing addresses and data to memory. A memory-order buffer ("MOB") 1050 facilitates speculative and out-of-order loads and stores and ensures that writes to memory take place in an order corresponding to the original instruction order of a program. A reorder buffer ("ROB") 1052 tracks all microinstructions that are currently being executed in the chains of functional units and, when the microinstructions corresponding to a program instruction have been successfully executed, notifies the retirement register file 1054 to commit the instruction execution to the architectural state of the process by ensuring that ISA registers are appropriate updated and writes to memory are committed.

A processor core is, of course, an exceedingly complex device, containing a forest of signal paths and millions of individual transistors and other circuit components. The myriad components and operational details are far beyond the scope of the current discussion. Instead, the current discussion is intended to provide a context for the performance-imbalance-monitoring registers included within a processor in order to facilitate performance monitoring with respect to hardware threads.

Figure 11:
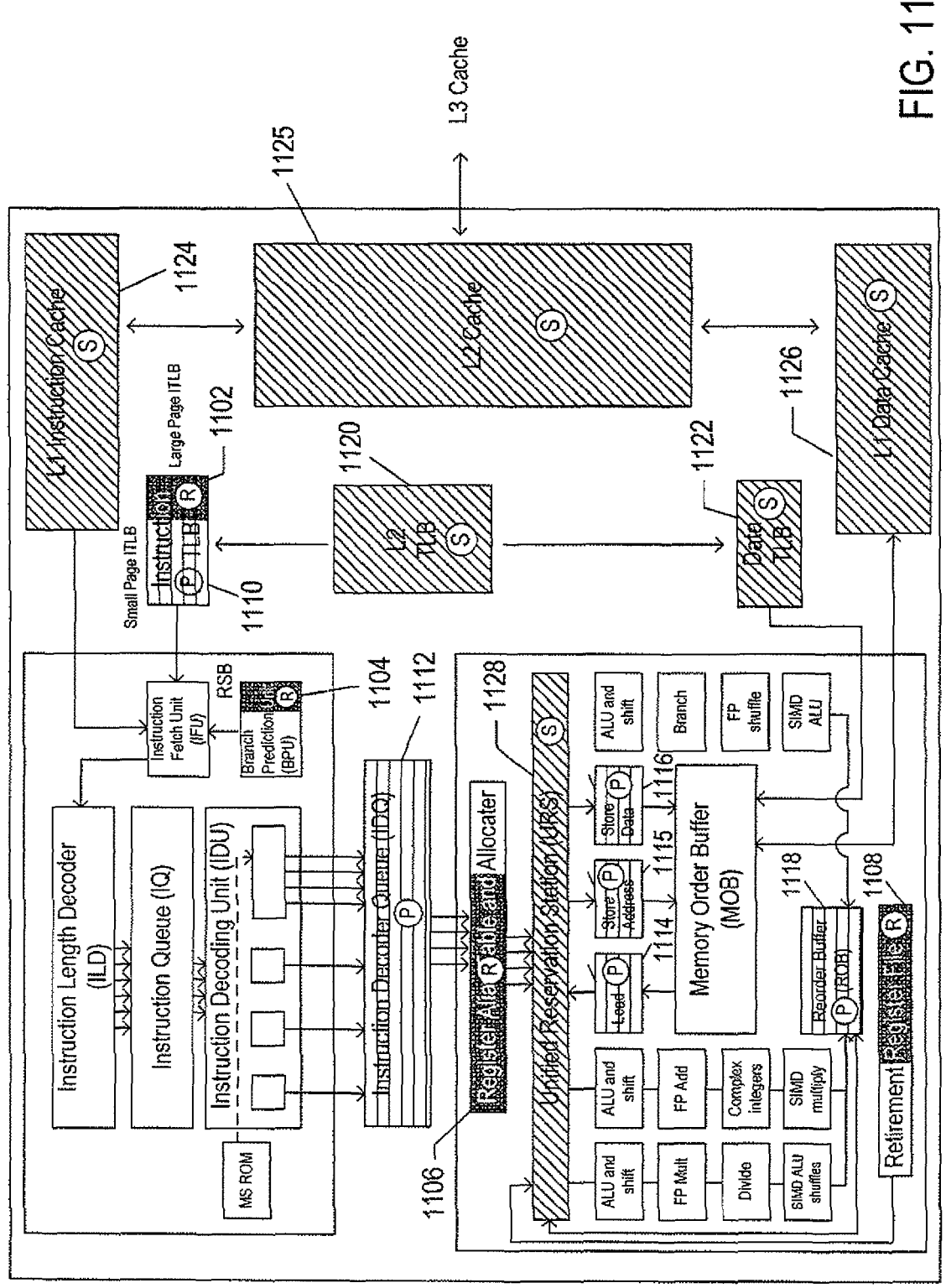
FIG. 11 illustrates, using the illustration conventions employed in FIG. 10, certain of the modifications to the processor core illustrated in FIG. 10 that enable two hardware threads to concurrently execute within the processor core.

FIG. 11 illustrates, using the illustration conventions employed in FIG. 10, certain of the modifications to the processor core illustrated in FIG. 10 that enable two hardware threads to concurrently execute within the processor core. There are four basic approaches employed to prepare hardware components for multi-threading. In a first approach, the hardware components are used identically in an SMT-processor core as they are used in a processor core that does not support simultaneous execution of multiple threads. In FIG. 11, those components that are not altered to support similar threads are shown identically as in FIG. 10. In a second approach, certain of the functional components of the microprocessor may be replicated, each hardware thread exclusively using one replicate. Replicated components are shown in FIG. 11 with shading as well as a circled "R." A portion of the first-level instruction TLB 1102 is replicated, as is the return-stack-buffer portion of the BPU 1104. The register alias table is replicated 1106 and, of course, the architecture state embodied in the register file is replicated 1108, with each hardware thread associated with its own architecture state. Yet another strategy is to partition the particular functional components, allowing a particular hardware thread to access and employ only a portion of the functional component. In FIG. 11, those functional components that are partitioned among hardware threads are indicated by a circled "P" and horizontal cross-hatching. Partitioned components include a portion of the first-level instruction TLB 1110, the IDQ 1112, load and store buffers 1114-1116, and the reorder buffer 1118. The partitioning may be a hard, fixed partitioning in which each of n hardware threads can access up to 1/n of the total functionality provided by the component, or may be a more flexible partitioning in which each hardware thread is guaranteed access to some minimal portion of the resources provided by the functional component, but the portion employed at any given point in time may vary depending on the execution states of the hardware threads. Finally, functional components may be shared, with the hardware threads competing for the resources provided by the functional component. Shared components are indicated in FIG. 11 by diagonal cross-hatching and circled "S" symbols. The shared components include the second-level TLB 1120, the data TLB 1122, the L1 and L2 caches 1124-1126, and the URS 1128. In certain cases, a very minimal portion of the resource provided by a shared component may be guaranteed to each hardware thread.

Those functional components that are not altered, the functional components that are replicated, with each hardware thread exclusively accessing its own copy, and the functional components that are strictly partitioned are not generally associated with thread-specific performance-monitoring problems. However, the functional components that are either flexibly partitioned or shared may be difficult to monitor in order to provide useful hardware-thread-specific performance-monitoring data. The performance-imbalance-monitoring registers which the current application discloses are therefore most usefully applied to flexibly partitioned and shared functional units of an SMT-processor core. The following discussion provides a high-level description of performance-imbalance-monitoring registers that are added to an SMT processor or SMT-processor core to supplement, according to the current application, the existing performance-monitoring registers of a processor in order to facilitate thread-specific monitoring.

Figure 12B:
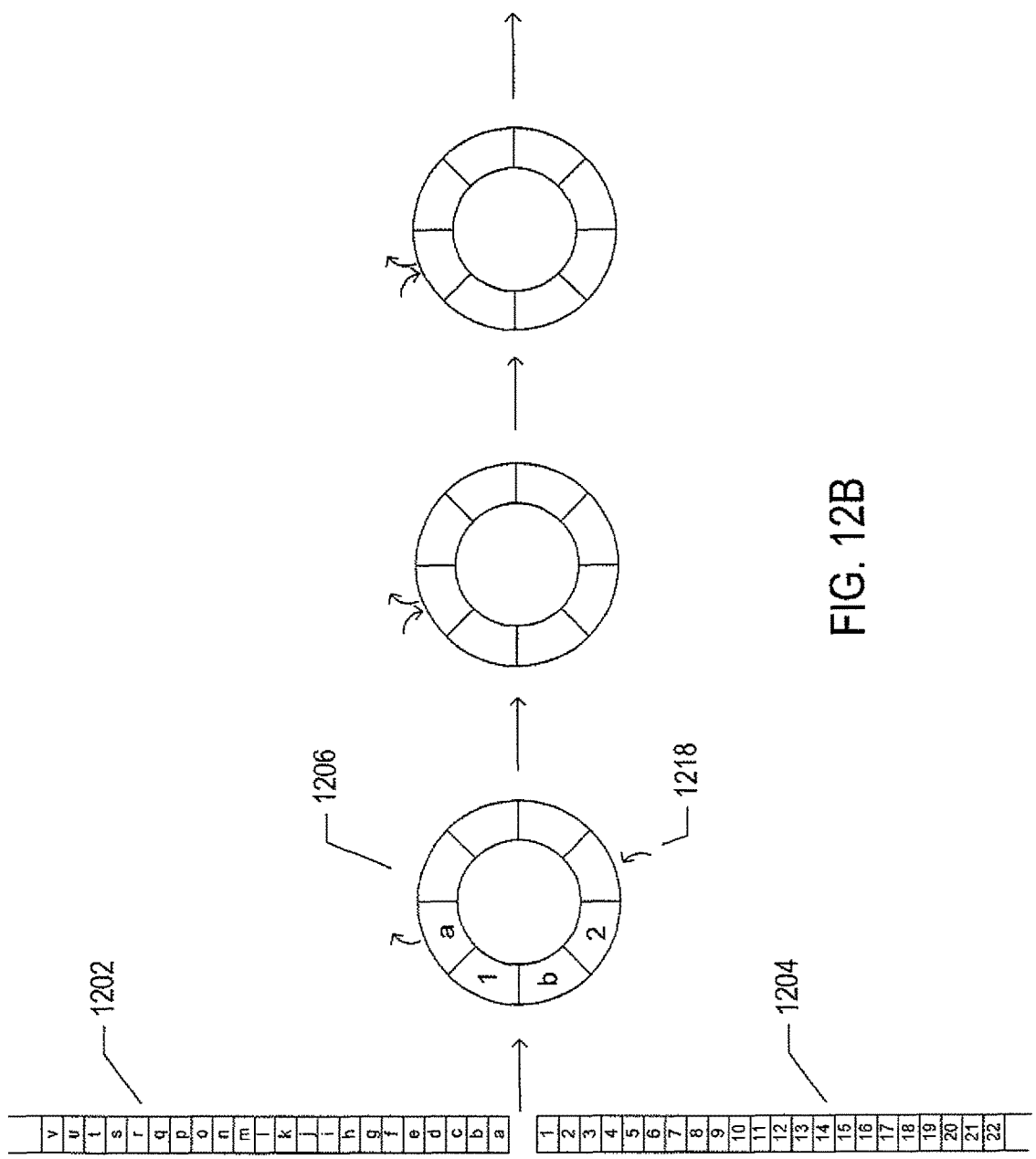

FIGS. 12A-G illustrate performance impacts due to resource exhaustion. These figures use a very simple queue-based pipeline to illustrate the problems that may occur in computational throughput as a result of resource exhaustion. The model used in FIGS. 12A-G is next described with reference to FIG. 12A. FIG. 12A shows a simple computational model in which data associated with a first hardware thread 1202 and data associated with a second hardware thread 1204 is obtained from a data source and input to a first circular queue 1206. The data is subsequently removed from the first circular queue 1206 and processed, as represented by arrow 1208, after which the processed data is placed in a second circular queue 1210. Data is removed from the second circular queue and processed, as indicated by arrow 1212, after which the processed data is placed onto a third circular queue 1214. Data is removed from the third circular queue and output, as indicated by arrow 1216. Although simple, this system of queues and interconnecting operations is similar to the execution pipeline within a processor core, as discussed above with reference to FIG. 10. Initially, in FIG. 12A the queues are empty and no data has been obtained from the data source 1202 and 1204. Note that the element of the circular queue to which a next data value is to be added is marked with an input arrow, such as input arrow 1218 pointing to an entry of the first queue 1206, and the queue element from which the next data is to be removed from the queue is marked with an output arrow, such as output arrow 1220. When the input arrow and output arrow are associated with the same queue element, the queue is empty. A full queue has only a single empty queue element.

Figure 12D:
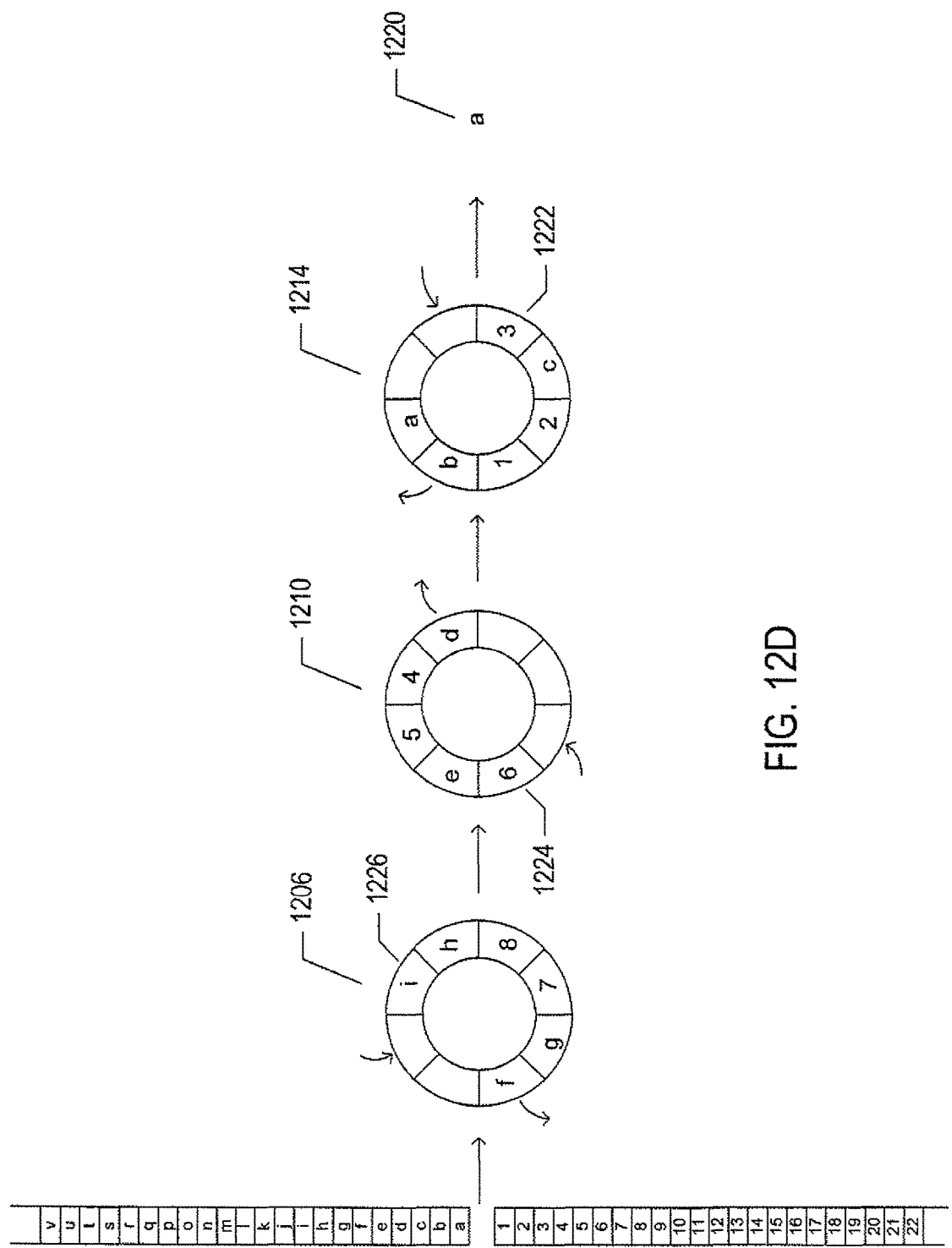

In FIG. 12B, four data values have been obtained from the data sources 1202 and 1204 and input to the first circular queue 1206. Note that the input arrow 1218 has moved counter-clockwise by four positions. In FIG. 12C, data has been removed from the first queue, processed, added to the second circular queue 1210, subsequently processed, and finally added to the third circular queue 1214. In the meantime, more data has been obtained from the source and added to the first circular queue and certain of that data has been processed and added to the second circular queue. At this point, as shown in FIG. 12D, the processing elements may reach a steady state, where, during each clock cycle, an element is output 1220, an element is removed from the second queue 1210 and processed, and placed into the third queue 1222, an element is removed from the first queue, processed, and placed into the second queue 1224, and an element is obtained from the data source and placed into the first queue 1226. Thus, in one clock cycle, a data acquisition step, two intermediate processing steps, and an output step all are executed in parallel, much like cars are manufactured along an assembly line. Were a processor to operate smoothly in a steady state fashion, a maximum number of instructions per clock cycle would be successfully executed. Unfortunately, disruptions occur.

Figure 12E:
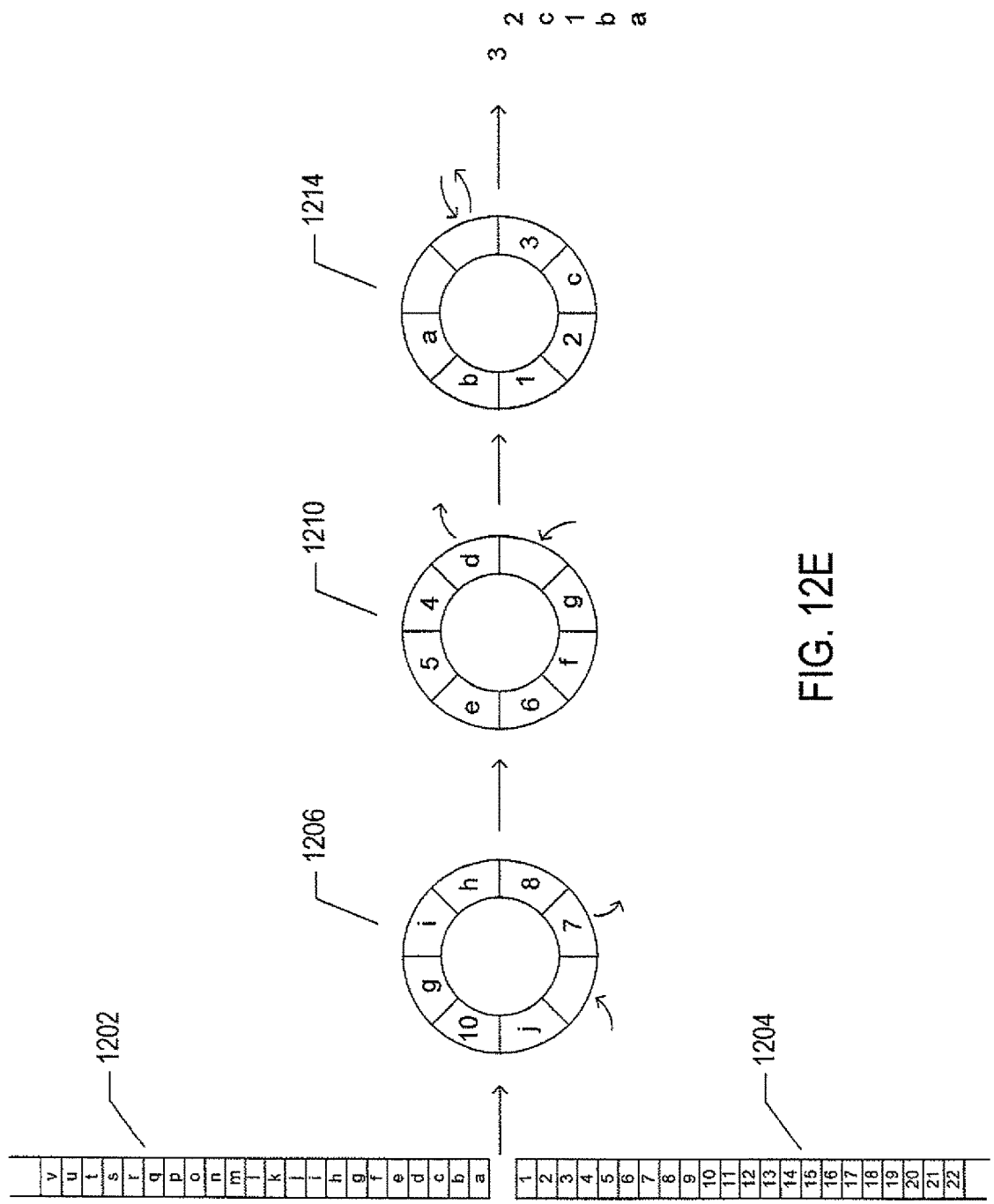
Figure 12F:
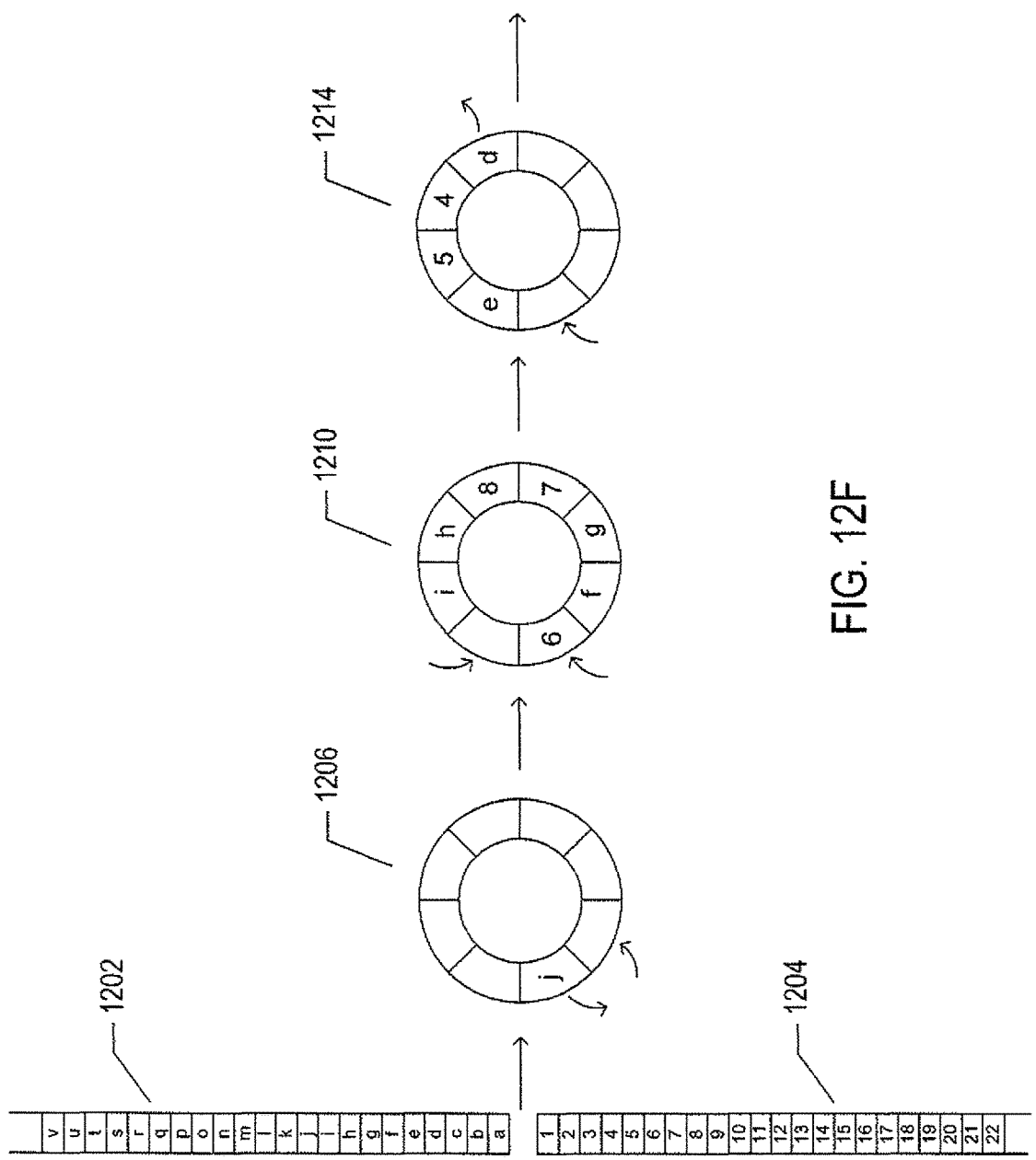
Figure 12G:
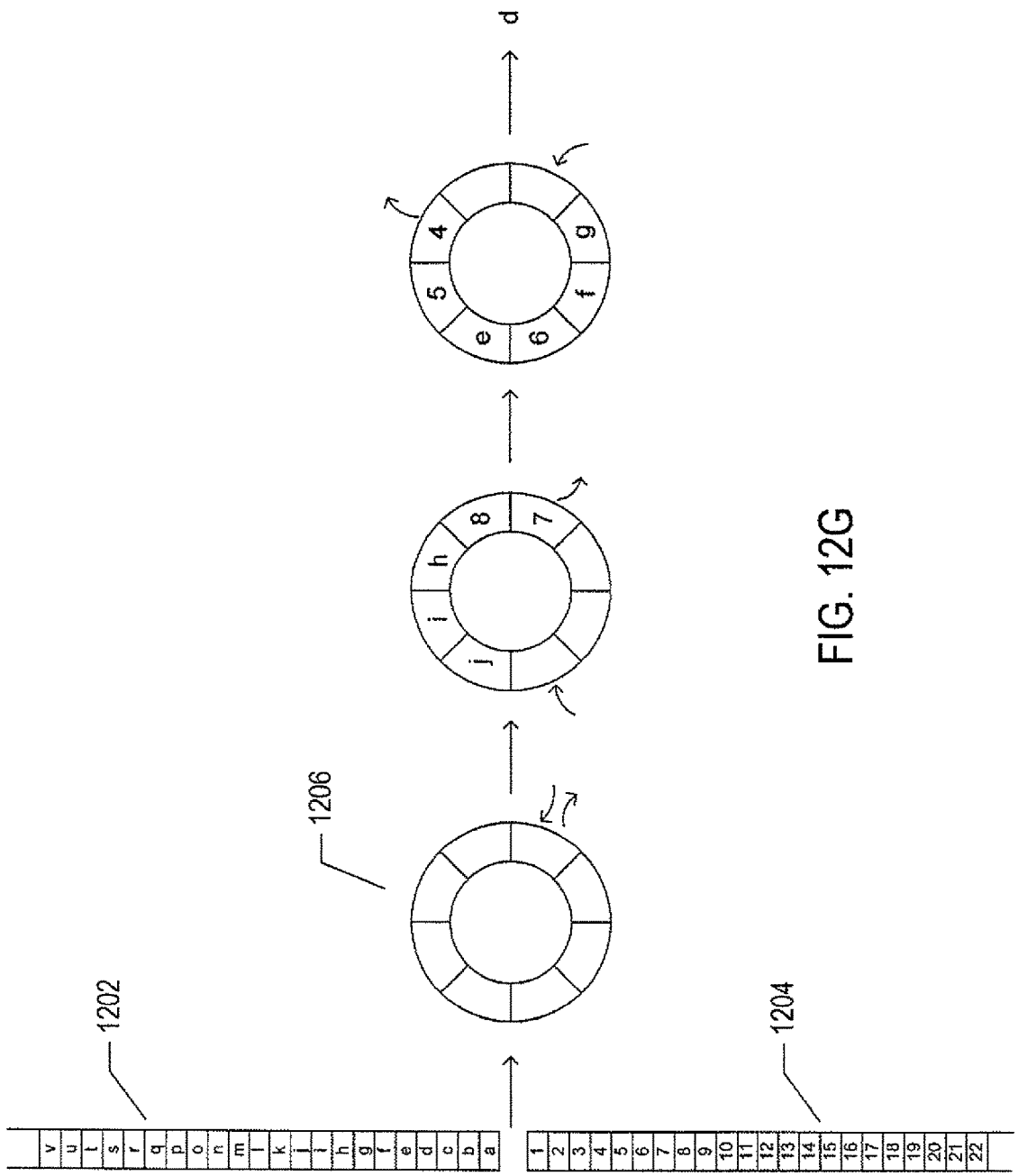

In FIG. 12E, processing data from the second queue 1210 has stalled, as a result of which all of the data formerly residing in the third queue 1214 has been output in successive clock cycles, leaving the third queue 1214 empty. Data continues to be obtained from the data source 1202 and 1204 until the first queue 1206 is completely filled. In this situation, data will not be output during subsequent clock cycles until processing of data removed from the second queue 1210 resumes. This may be viewed as a type of resource exhaustion. In essence, the resource represented by the second processing step is, for whatever reason, not currently available and is therefore exhausted. As a result, processor cycles are lost, since data is not output on subsequent cycles once the final queue 1214 is empty. As shown in FIG. 12F, processing of data in the second queue 1210 has resumed, as a result of which the third queue 1214 is beginning to fill with new data and the first queue 1206 is now nearly empty, because data has not yet begun to again flow from the data source 1202 and 1204 to the first queue 1206. As shown in FIG. 12G, data output has resumed, but, as a result of the delay in obtaining data from the data sources 1202 and 1204, the first queue 1206 is now empty. As a result, the lack of entries in the first queue 1206 will percolate downstream, as data continues to be processed and output, eventually resulting in a temporarily empty final queue 1214 which will again result in lost cycles during which data is not output.

There are many different points in the instruction-execution paths within a processor and many different functional components, or resources, within a processor with respect to which resource-exhaustion events may occur. For example, microinstruction execution may stall due to the inability for a load or store operation to be queued to an already-full queue for processing. Processing of an instruction may stall due to the inability to receive data from an L1 data cache, as a result of which many processing cycles need to be expended, and processing suspended while the needed data is retrieved from downstream caches, memory, or even a mass-storage device. Hardware threads, to a certain extent, may address performance degradation due to resource exhaustion. When execution of one thread is stalled or slowed, due to a resource-exhaustion event, it is often the case that functional units that would otherwise remain inactive for many clock cycles can be instead used to process instructions for a different, simultaneously executing hardware thread. In addition, because of the high degree of parallelism within a modern processor, it is even possible for other instructions of a particular hardware thread to be executed while execution of one instruction of the hardware thread is stalled due to resource exhaustion. In general, a modern processor is designed to keep as many functioning units as possible effectively operating with each clock cycle of the processor in order to achieve the highest possible IPC.

However, there may be cases in which, even though a relatively high IPC is achieved during execution of simultaneously executing threads, the actual computational throughput is not evenly balanced between the two threads. Indeed, there are cases in which a program can be designed to unfairly monopolize a large portion of the overall computational bandwidth provided by an SMT processor or SMT-processor core to multiple programs simultaneously executing as hardware threads within the SMT processor or SMT-processor core. Even when not purposely designed to exhibit such behaviours, certain types of programs executing as hardware threads within an SMT processor or SMT-processor core may end up monopolizing far more than their fair share of computational resources and computational throughput with respect to other programs simultaneously executing as hardware threads within the SMT processor or SMT-processor core. As one example, a first process may have an instruction and/or data working set substantially larger than the working set of the other simultaneously executing hardware threads within a processor or processor core. As a result, the large working-set hardware thread may end up frequently evicting instructions and data from the L1 cache used by other hardware threads so that the other hardware threads end up spending a large portion of their processor cycles restoring their instructions and data to the L1 cache. Similarly, a process may exhibit patterns of instruction execution that result in frequently filling intermediate queues, resulting in stalled execution pipelines that significantly degrade the performance achieved by other hardware threads. Certain types of performance imbalances may be reflected in the overall IPC, CPI, and various performance-monitoring registers, while, in other cases, a processor may appear to be relatively busy and efficient, but certain of the hardware threads suffer significantly degraded computational throughput. Even in the cases where performance imbalances among hardware threads is manifested in the IPC, CPI, or various performance-monitoring-register values, it may be difficult or impossible to determine the computational throughput achieved by particular hardware threads and to identify particular hardware threads that cause other hardware threads to frequently stall, waiting for exhausted resources, and that that monopolize processor resources to the performance detriment of other hardware threads. It is to address these issues that the current application discloses performance-imbalance-monitoring registers to allow performance imbalances among simultaneously executing hardware threads to be detected. Detection of performance imbalances among simultaneously executing hardware threads may allow, as one example, a cloud-computing facility to more fairly bill cloud-computing clients based on actual computational throughput rather than based on execution time or on performance metrics averaged across multiple simultaneously executing hardware threads, only one or a portion of which execute programs on behalf of a given particular cloud-computing client and which may frequently stall due to activities of other hardware threads executing on behalf of cloud-computing clients other than the particular cloud-computing client.

Figure 13A:
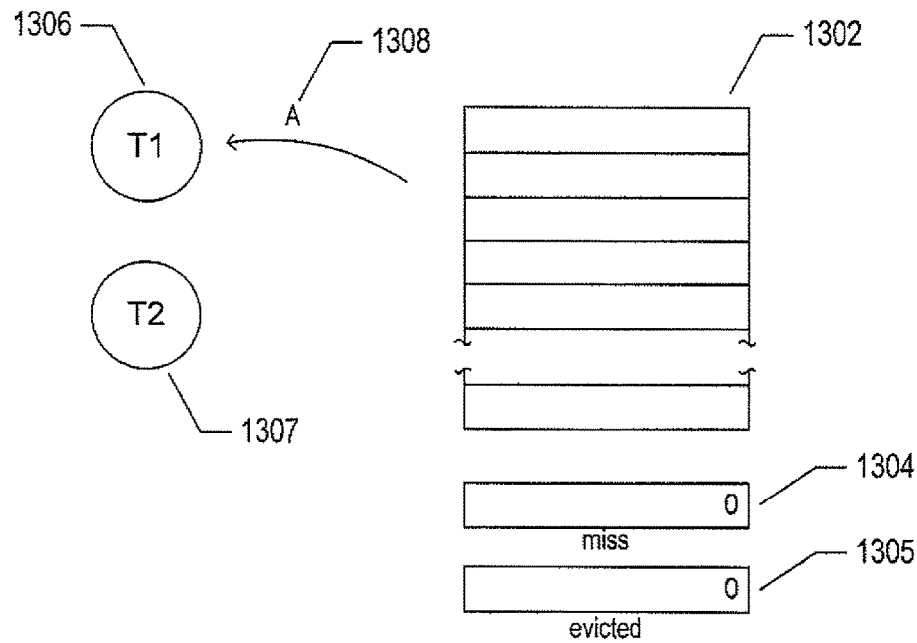
FIGS. 13A-J illustrate a first example of performance-imbalance-monitoring registers added to supplement the performance-monitoring registers of a processor in order to detect potential performance imbalances among simultaneously executing hardware threads.
Figure 13B:
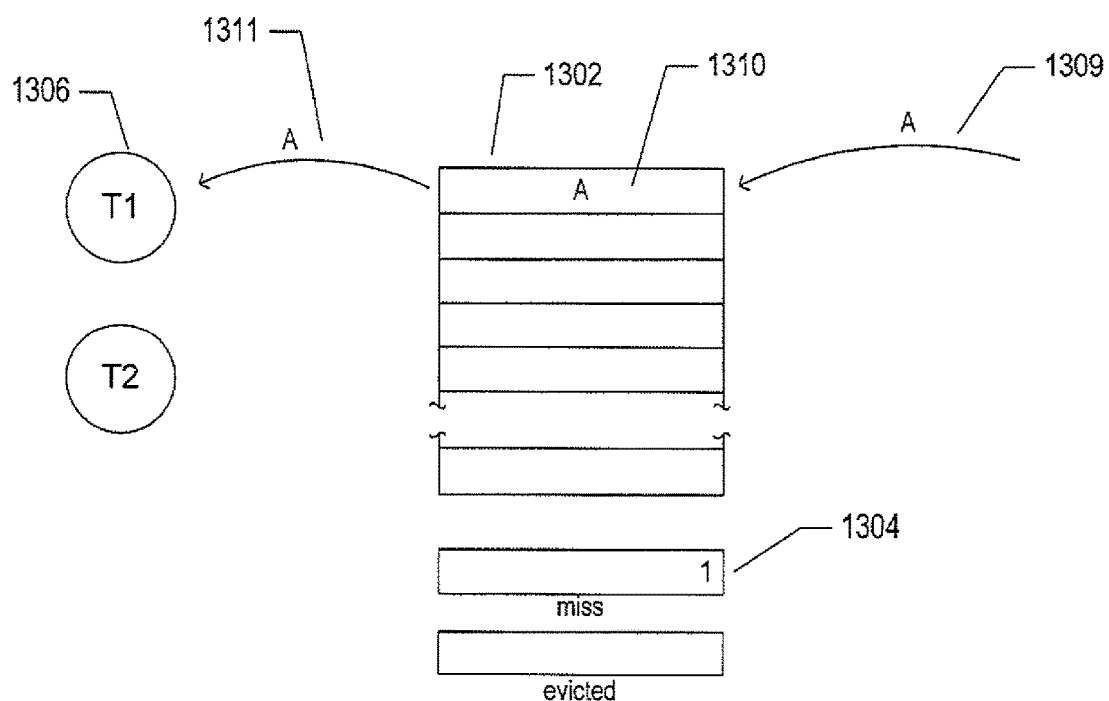

FIGS. 13A-J illustrate a first example of performance-imbalance-monitoring registers added to supplement the performance-monitoring registers of a processor in order to detect potential performance imbalances among simultaneously executing hardware threads. FIGS. 13A-J all use identical or similar illustration conventions, next discussed with reference to FIG. 13A. In FIG. 13A, a hardware resource 1302 from which hardware threads extract data is shown, along with two performance-monitoring registers 1304-1305 and symbolic indications of two hardware threads 1306-1307. The hardware resource 1302 functions similarly to a memory cache. In FIG. 13A, the hardware resource 1302 is empty. The first hardware thread 1306 attempts to access the resource 1302 in order to extract a particular data item represented, in FIG. 13A, by the symbol "A" 1308. Because the requested data is not resident within the resource, as shown in FIG. 13B, the data must be obtained from another, downstream resource, represented by curved arrow 1309 in FIG. 13B, installed in an entry 1310 of hardware resource 1302, after which the access of the data A by the first hardware thread 1306 can be satisfied, as indicated by curved arrow 1311 in FIG. 13B. Because the desired data item was not resident within the hardware resource 1302 at the time of the initial access 1308, the event depicted in FIGS. 13A-B represents a type of resource exhaustion similar to a cache miss. As a result, as indicated in FIG. 13B, the performance-monitoring register 1304 is incremented to indicate that a resource-miss event occurred. Miss events lead to potential instruction-processing stalls and to expenditure of cycles and incurring of delays as a result of a need to retrieve desired data from downstream resources. When the IPC decreases, alerting performance-monitoring entities of an ensuing performance degradation, performance-monitoring registers, such as performance-monitoring register 1304, can be examined to determine probable and potential causes of the performance degradation. In the case of a relatively high number of resource-miss events, it is possible that a program can be redesigned and re-implemented to execute a smaller working set, placing fewer burdens on a particular hardware resource and decreasing the frequency of miss events. Alternatively, when it is not possible to redesign and re-implement the process, it may be possible to ensure that the process either runs alone in a processor or processor core or simultaneously executes with other hardware threads that do not place similar, significant demands on the particular hardware resource. However, a single miss performance-monitoring register does not provide sufficient information, by itself, to determine whether a high miss rate is predominately attributable to a particular hardware thread or subset of hardware threads or is, instead, the product of high demands for a particular hardware resource by simultaneously executing hardware threads within a SMT processor or SMT-processor core.

Figure 13C:
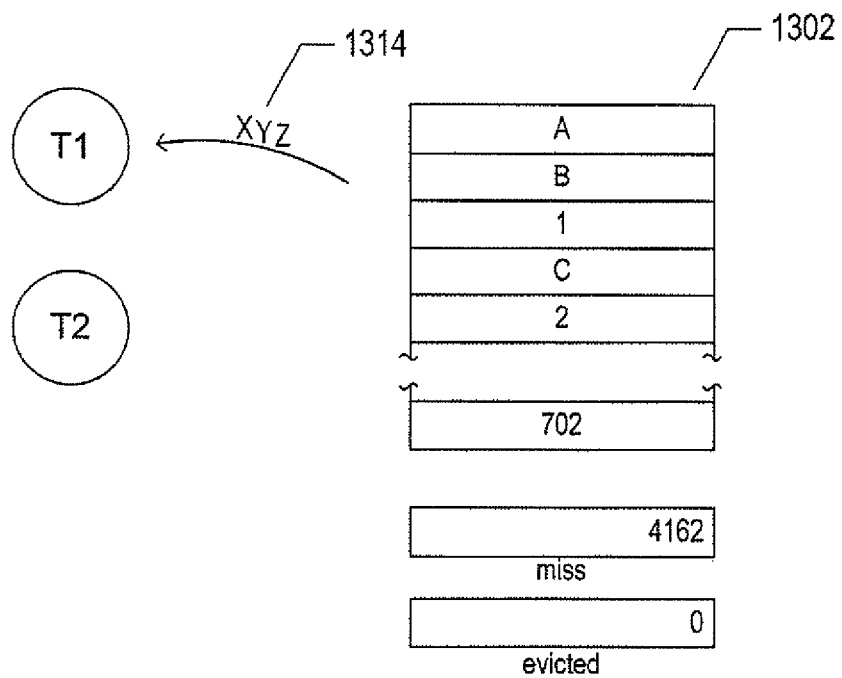
Figure 13D:
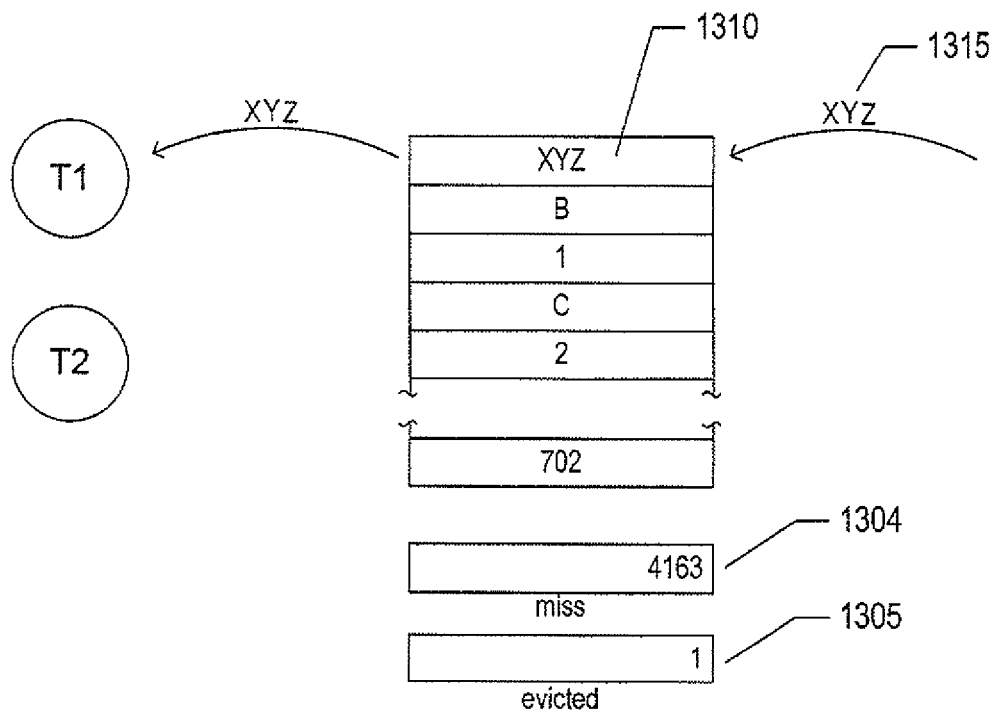

FIGS. 13C-D illustrate operation of the second performance-monitoring register (1305 in FIG. 13A) associated with hardware resource 1302. In FIG. 13C, the first hardware thread accesses the hardware resource 1302 in order to retrieve a particular data represented symbolically as "XYZ" 1314. The desired data value is not resident within the hardware resource and, moreover, the hardware resource is full, with no empty entries in which to input the desired data XYZ. As a result, as shown in FIG. 13D, data XYZ is retrieved from another, downstream, hardware resource, as indicated by curved arrow 1315 in FIG. 13D and placed into entry 1310, overwriting data A that previously resided in this entry prior to the copy operation 1315. Thus, in the access illustrated in FIGS. 13C-D, not only does the access represent a miss event, but satisfying the access request resulted in eviction of data already residing in the resource. Therefore, both the miss performance-monitoring register 1304 and the evicted performance-monitoring register 1305 are incremented. In the current example, there may be resource-clear operations that free up resource entries without evicting data residing in the resource that may be potentially needed in the near future. Thus, in the current example, the counts in the miss and evicted registers may provide useful and non-redundant information for performance-analysis purposes.

In the case of data evictions from the hardware resource 1302 in the current example, a particularly significant problem in thread progression may develop in the case that the majority of evictions are directed to data associated with a particular hardware thread. In this case, the hardware thread may be severely penalized in performance due to the need to continuously receive desired data from downstream hardware resources as a result of miss events. With a single evicted performance-monitoring register, it is not possible to determine whether a high number of evictions are fairly distributed among simultaneously executing hardware threads or whether the burden of resource evictions falls prominently on one or a subset of the simultaneously executing hardware threads. As with miss events, there may be ways to ameliorate and manage performance degradation due to high rates of resource evictions by redesigning and re-implementing particular programs and by scheduling execution of programs in some alternative fashion.

Figure 13E:
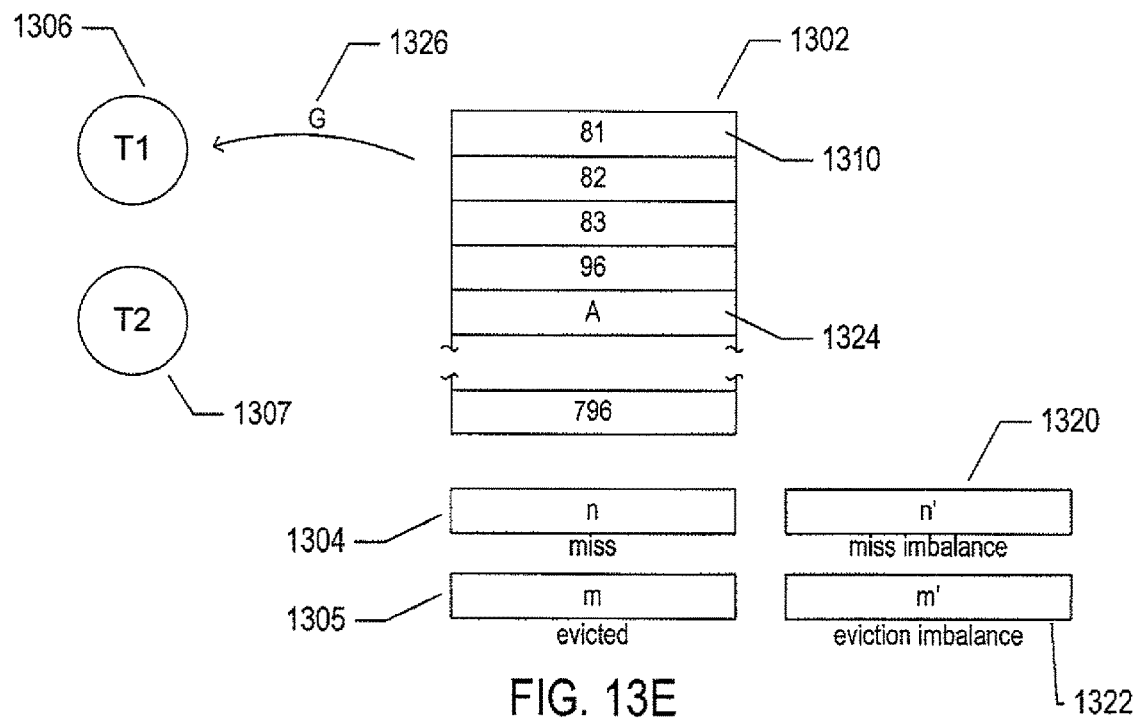
Figure 13F:
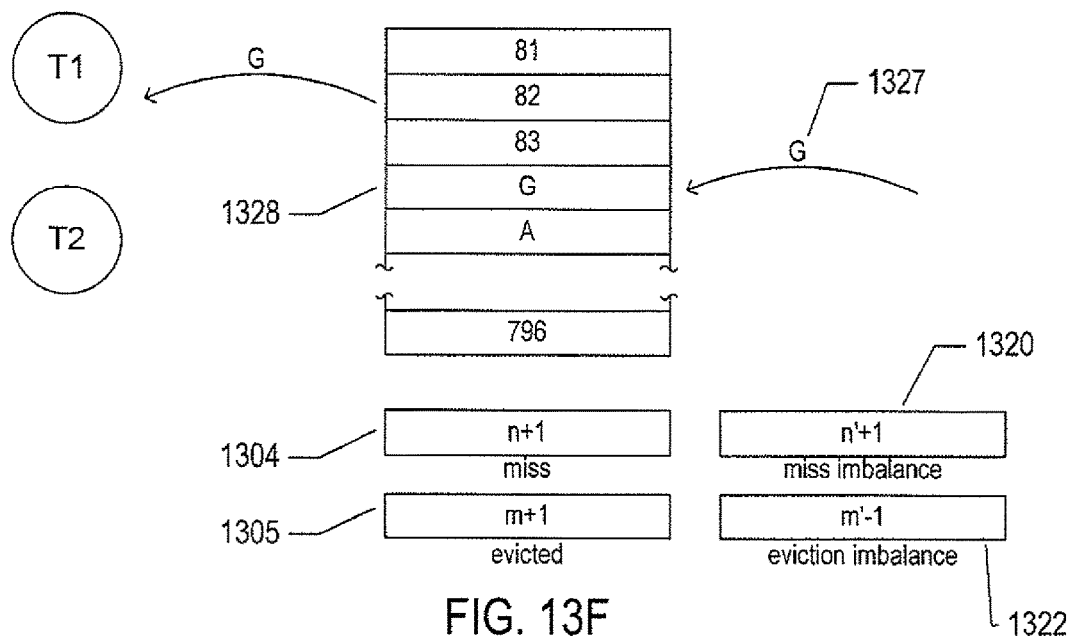

FIGS. 13F-J illustrate an example of the performance-imbalance-monitoring registers to which the current application is directed. As shown in FIG. 13E, in addition to the miss 1304 and evicted 1305 performance-monitoring registers, which count miss and eviction events, two new associated performance-imbalance-monitoring registers 1320 and 1322 have been added to the processor. In the example shown in FIG. 13E, the data in the hardware resource associated with the first hardware thread 1306 is represented with letter symbols, such as the data in entry 1324 represented by the symbol "A," while the data residing in the hardware resource associated with the second hardware thread 1307 is represented by numbers, such as the number "81" in entry 1310. Most of the data within the hardware resource is associated with the second hardware thread. As shown in FIG. 13E, the first hardware thread 1306 attempts to access a particular data value G 1326 which does not reside in the hardware resource 1302. As a result, the access represents a miss event, leading to incrementing the value stored in the miss register 1304, as shown in FIG. 13F. As shown in FIG. 13F, data G is retrieved from a downstream hardware resource, as indicated by curved arrow 1327, and written into entry 1328, formerly inhabited by data referred to as "96" in FIG. 13E and associated with the second hardware thread 1307. This represents an eviction event, and therefore the evicted register 1305 is also shown to be incremented in FIG. 13F. However, as shown in FIG. 13F, the contents of the miss-imbalance 1320 are also incremented and the contents of the eviction-imbalance 1322 register are decremented. The miss-imbalance register is incremented because the miss event occurred when the first hardware thread was using only a relatively small portion of hardware resource 1302. The fact that the first hardware thread is associated with only a very few entries in the hardware resource and suffered a miss event when attempting to access data from the hardware resource indicates a potential performance imbalance with respect to the hardware resource suffered by the first hardware thread 1306. Were, by contrast, a larger portion of the entries in the hardware resource to contain data associated with the first hardware thread, the miss-imbalance register would not have been incremented, as the miss event would not have been a product of imbalance in the usage of the hardware resource by the two hardware threads 1306 and 1307. Had most of the entries in the hardware resource been associated with the first hardware thread, and had the second hardware thread experienced a miss event when accessing the hardware resource, then the miss-imbalance register would have been decremented. When the miss-imbalance register has a value close to 0, then there is no indication of a potential performance imbalance associated with the miss events for the hardware resource. When the miss-imbalance register has a high positive value, then there is strong indication of a performance imbalance associated with miss events to the detriment of the first thread. When the miss-imbalance register has a large negative value, then there is a strong indication of a performance imbalance suffered by the second hardware thread with respect to the hardware resource. The eviction-imbalance register is decremented, in FIG. 13F, to indicate that an entry associated with the second hardware thread was evicted as a result of an access by the first hardware thread. Had an entry associated with the first hardware thread been evicted, the eviction-imbalance register would have neither been incremented nor decremented. Had an entry associated with the first thread been overwritten as a result of an access by the second thread, then the eviction imbalance register would have been incremented.

Figure 13G:
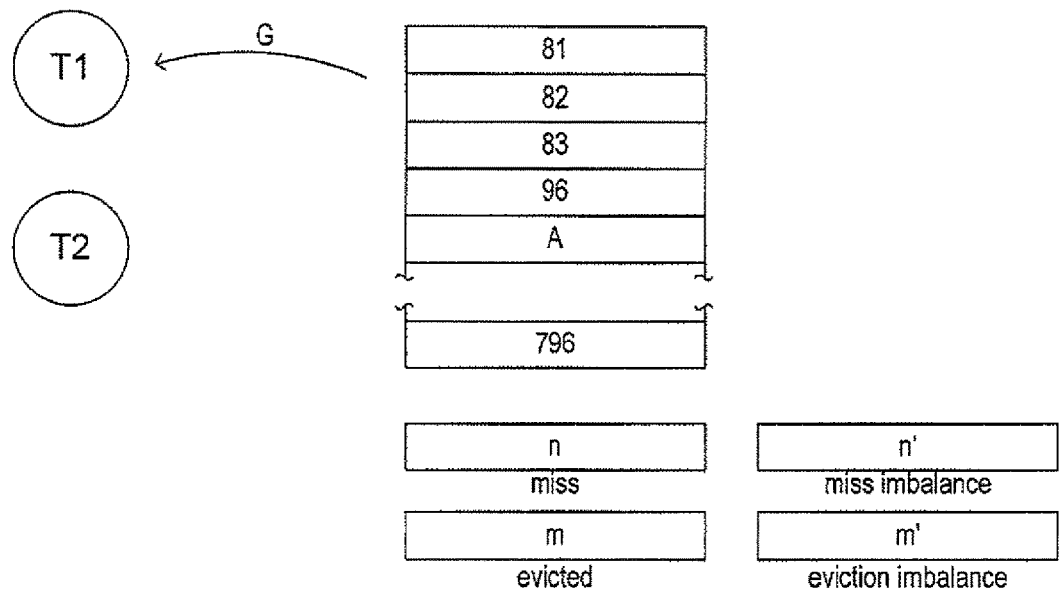
Figure 13H:
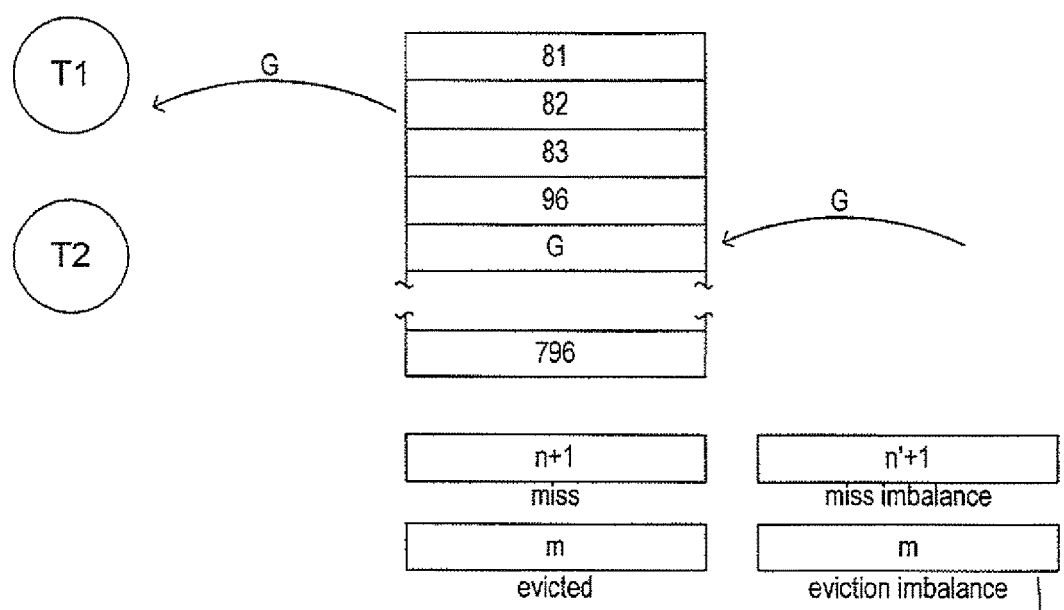
Figure 13I:
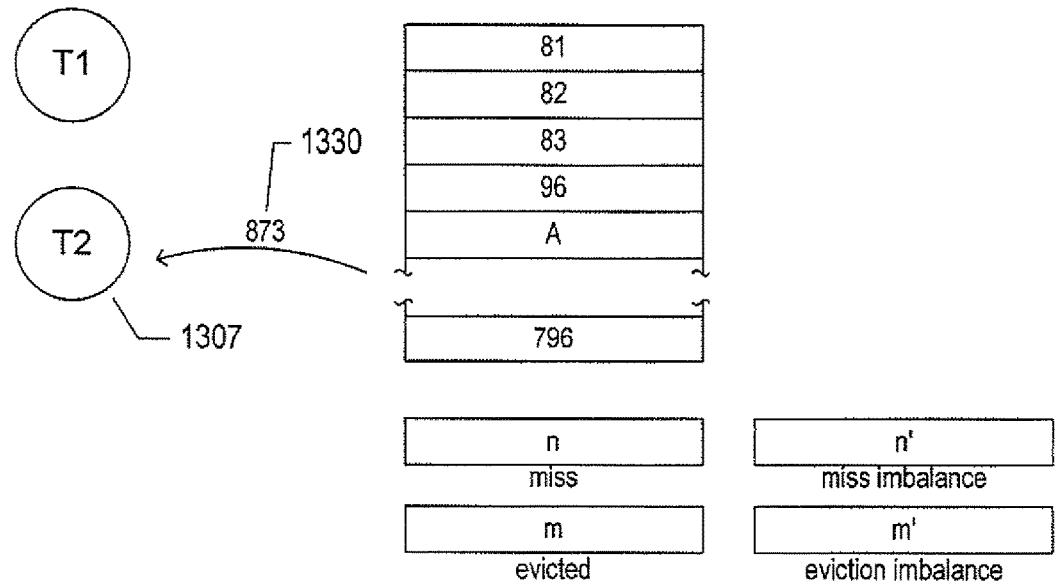
Figure 13J:
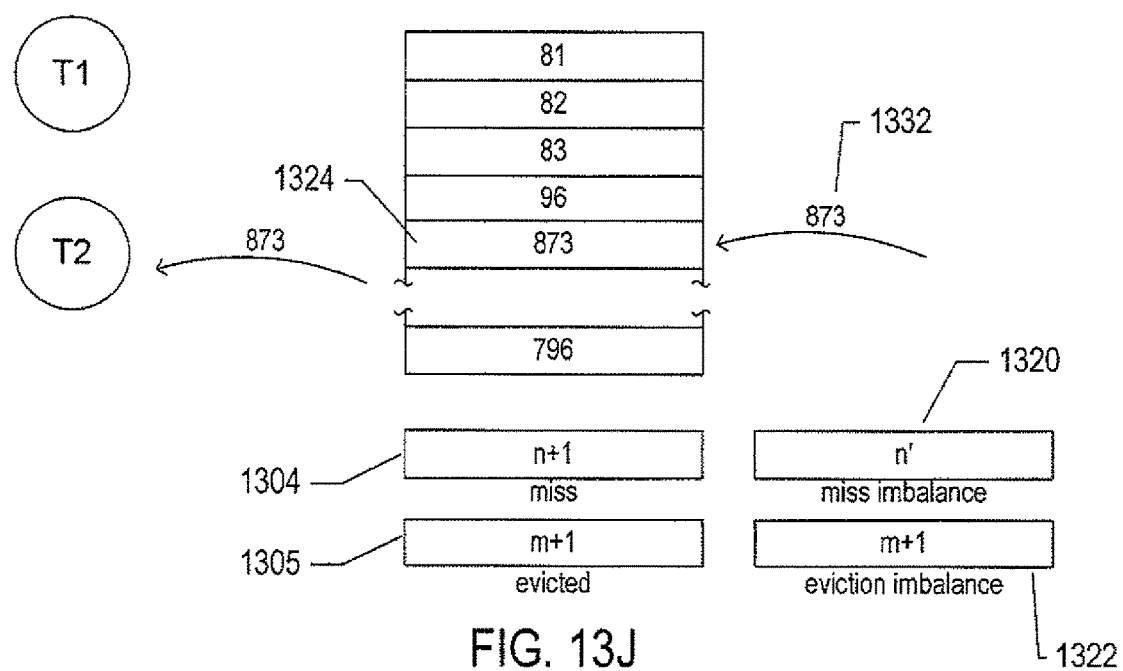

FIG. 13G illustrates the same access illustrated in FIG. 13E, but, as shown in FIG. 13H, the entry containing data A associated with the first hardware thread and is overwritten, rather than a data entry associated with the second hardware thread. As a result, the eviction-imbalance register is neither incremented nor decremented, as shown in FIG. 13H. FIG. 13I illustrates the same hardware-resource state as illustrated in FIGS. 13E and 13G, but now the second hardware thread 1307 attempts to access the hardware resource to retrieve data 873 (1330) and experiences a miss event. While the miss register 1304 is therefore incremented, the miss-imbalance register 1320 is not incremented, as shown in FIG. 13J, since the second hardware thread is associated with the majority of entries of the hardware resource. However, when the data value 873 is retrieved from a downstream hardware resource 1332, it is written into entry 1324 that formerly stored the data value A associated with the first hardware thread, as a result of which the evicted register 1305 is incremented and the eviction-imbalance register 1322 is also incremented, as shown in FIG. 13J, to indicate than an entry of the data value associated with the first hardware thread was evicted due to an access by the second hardware thread.

Thus, as explained above, the performance-monitoring registers 1304 and 1305 provide indications of the number or frequency of miss events and eviction events, and the miss-imbalance and eviction-imbalance registers provide indications of potential performance imbalances experienced by particular hardware threads as a result of miss events and eviction events.

Rather than using a single performance imbalance register with positive values indicating performance imbalance potentially experienced by a first hardware thread and negative values indicating a potential performance imbalance experienced by a second hardware thread, individual accumulator performance-imbalance registers may be provided for each hardware thread. In addition, a control register may be provided to allow the threshold proportion of entries of the hardware resource below which miss events indicate performance imbalances to be configured by a VMM or performance-monitoring software.

Figure 14A:
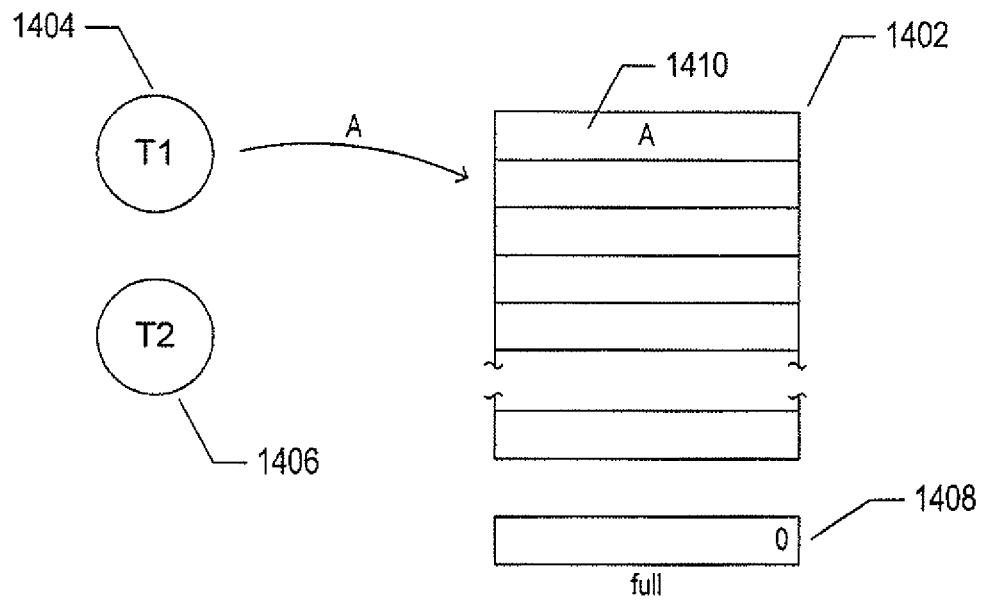
FIGS. 14A-D illustrate another example of performance-imbalance-monitoring registers.
Figure 14B:
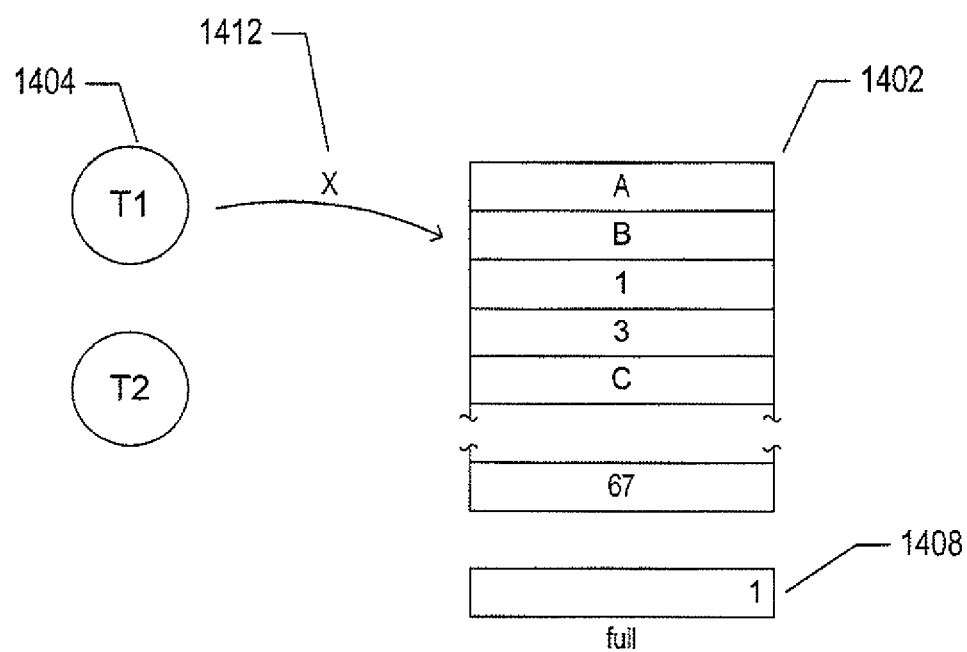

FIGS. 14A-D illustrate another example of performance-imbalance-monitoring registers. FIG. 14A shows a hardware resource 1402 into which either a first hardware thread 1404 or a second hardware thread 1406 may queue data values. As in FIGS. 13A-J, the values associated with the first hardware thread 1404 are represented by letter symbols and data values associated with the second hardware thread are represented by numeric symbols. Thus, hardware resource 1402 is similar to any of various different types of queues within a processor, such as a load-store queue ("LSQ"). In addition, the hardware resource 1402 is associated with a performance-monitoring register 1408, labeled "full" in FIG. 14A, which accumulates counts of resource-exhaustion events that occur when a hardware thread attempts to queue a data value into the hardware resource when there are no more entries available for storing data values within the hardware resource. In FIG. 14A, the first thread 1404 accesses the hardware resource 1402 to store data A into the first entry 1410 of the hardware resource. Later, as shown in FIG. 14B, when the hardware resource is full and there are no available entries for storing data, the first hardware thread 1404 attempts to store data X 1412 into hardware resource 1402. In this case, the access stalls and the full performance-monitoring register 1408 is incremented, as shown in FIG. 14B. Thus, the performance-monitoring register 1408 provides an indication of the number of thread stalls experienced due to the hardware resource being full when a thread attempts to store yet an additional data value into the hardware resource. Again, as in the example discussed with reference to FIGS. 13A-J, this performance-monitoring register may provide indications of potential performance-degradation problems, but does not allow a VMM, operating system, or performance-monitoring software to determine whether the resource-full events, another type of resource-exhaustion event, occur because one or a subset of simultaneously executing hardware threads are monopolizing the resource and effectively using all or a majority of the data-storage capacity to the detriment of other simultaneously executing hardware threads.

Figure 14C:
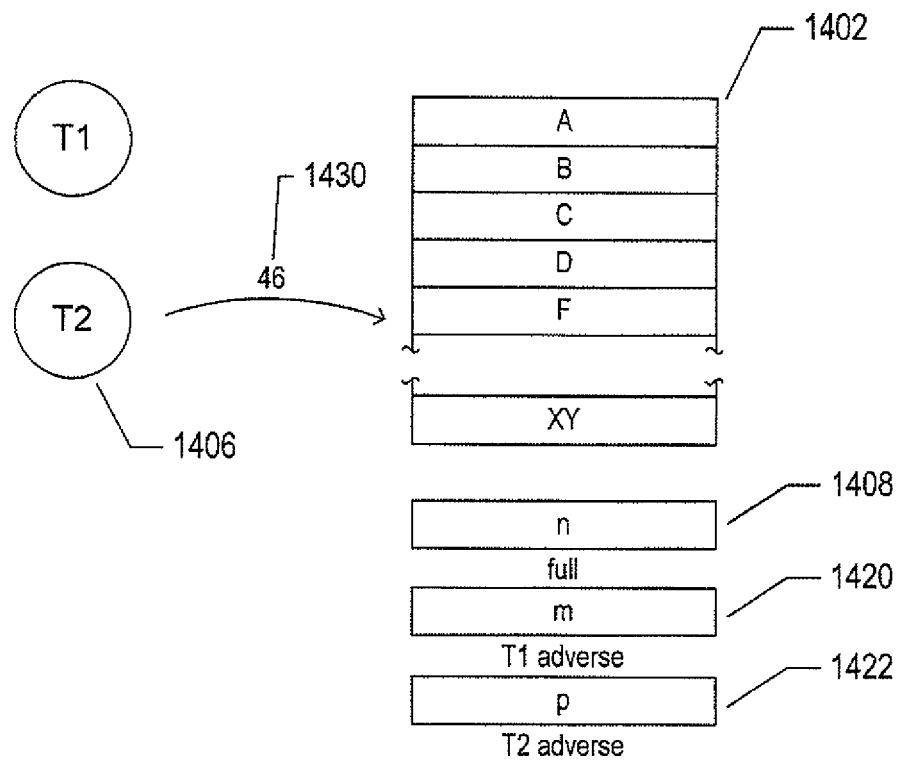
Figure 14D:
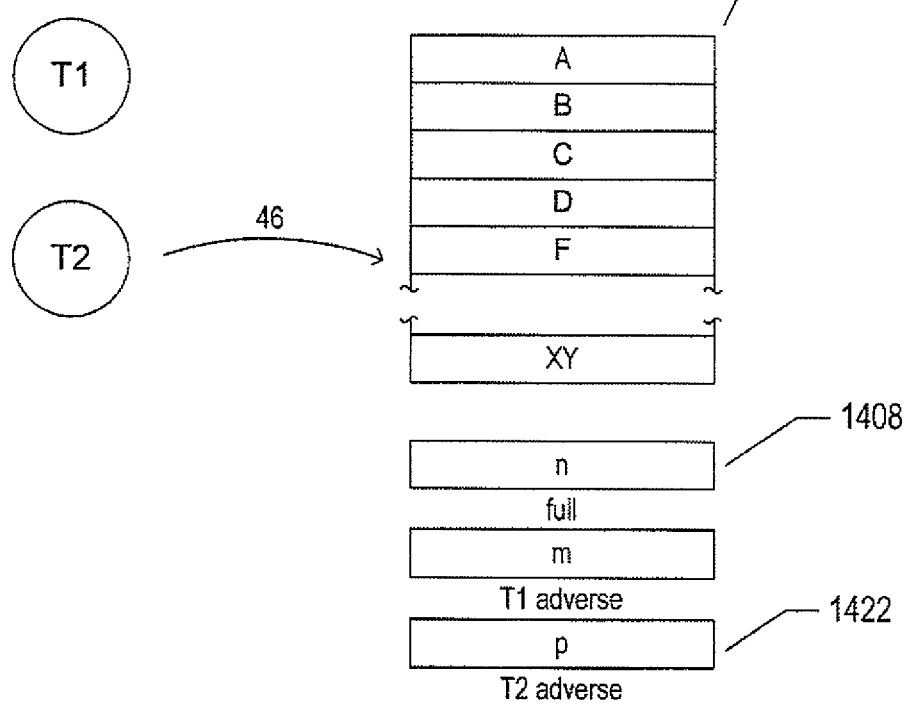

In FIG. 14C, the hardware resource 1402 discussed above with reference to FIGS. 14A-B is shown associated with the performance-monitoring register 1408 as well as with two performance-imbalance-monitoring registers 1420 and 1422. The first performance-imbalance-monitoring register 1420 accumulates counts of full events in which the first hardware thread is stalled when attempting to store data into the hardware resource while the first hardware thread is associated with less than some threshold portion of entries in the hardware resource. A second performance-imbalance-monitoring register 1422 accumulates counts of full events in which the second hardware thread 1406 attempts to store data into the hardware resource when the hardware resource is full and when the second hardware thread is associated with less than some threshold number of entries within the hardware resource 1402. In the example shown in FIG. 14C, the second hardware thread 1406 attempts to store a data value 1430 into the hardware resource 1402 when the hardware resource is full. In this case, a majority of entries containing data in the hardware resource are associated with the first hardware thread. As a result, the stall experienced by the second hardware thread in attempting to store data 46 results not only in incrementing the full performance-monitoring register 1408, but also incrementing the second performance-imbalance-monitoring register 1422, as shown in FIG. 14D, to indicate a potential performance imbalance experienced by the second hardware thread.

There are many different ways of associating performance-imbalance-monitoring registers with hardware resources within a processor in order to accumulate indications of potential performance imbalances due to resource-exhaustion events, two of which are discussed above with reference to FIGS. 13A-J and FIGS. 14A-D. Next, using high-level control-flow diagrams, examples are provided for implementation of a performance-imbalance-monitoring register and for the use of data stored in performance-imbalance-monitoring registers by a VMM.

Figure 15:
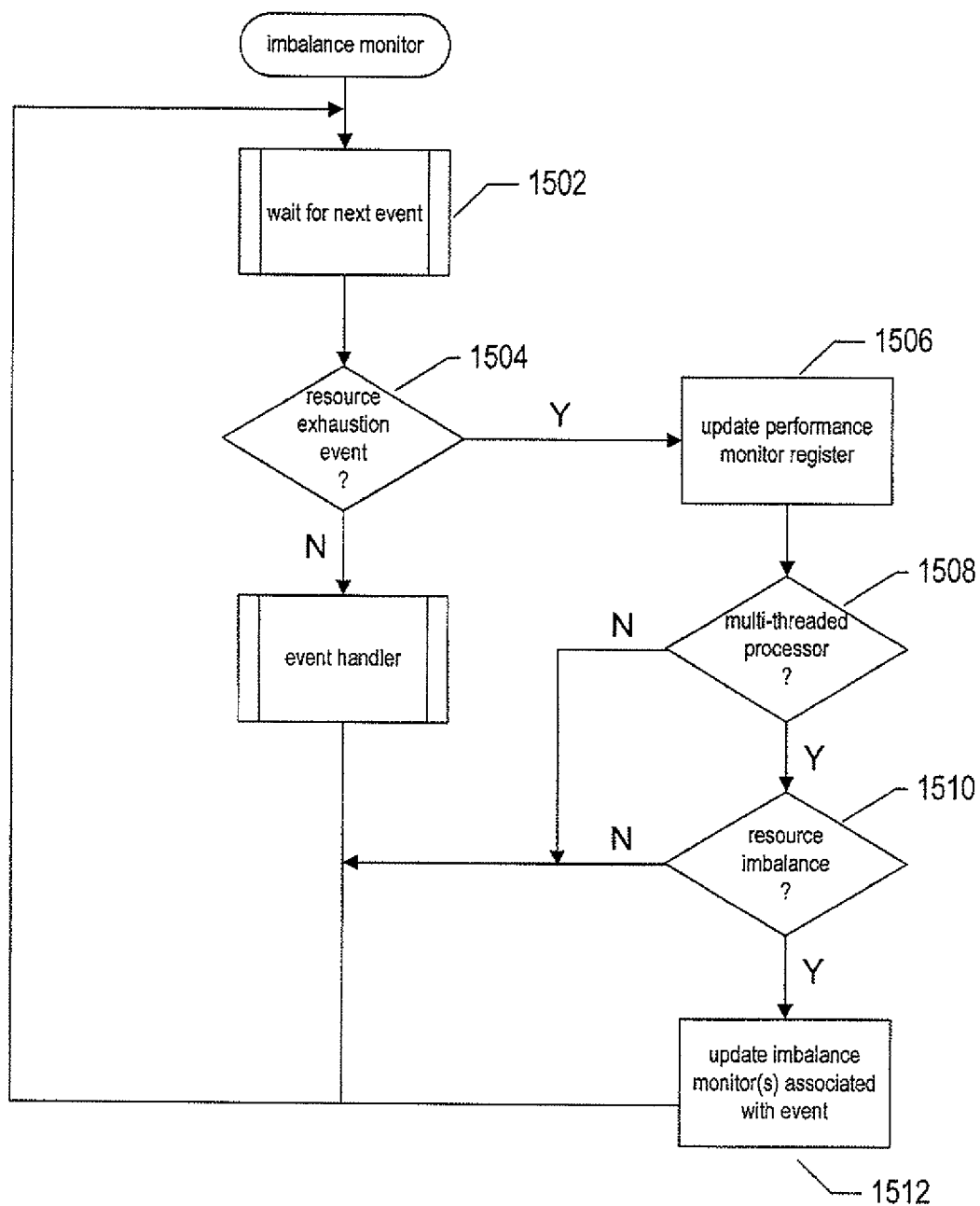
FIG. 15 illustrates implementation of a performance-imbalance-monitoring register within a processor.

FIG. 15 illustrates implementation of a performance-imbalance-monitoring register within a processor. In step 1502, an event-handling loop waits for a next event to occur. When an event occurs, in step 1504, the processor determines whether or not a resource-exhaustion event has occurred. When a resource-exhaustion event has occurred, then, in step 1506, the performance monitor or performance monitors associated with the resource are updated, such as updating of performance-monitoring registers 1304 and 1305 in FIG. 13D, discussed above. When the processor is a multi-threaded processor, as determined in step 1508, and when the resource-exhaustion event has occurred under conditions that indicate a resource imbalance, as determined in step 1510, then a performance-imbalance-monitoring register or registers associated with the event are updated, in step 1512, such as updating of performance-imbalance-monitoring registers 1320 and 1322 in FIG. 13F. As mentioned above, there are many different types of resources and corresponding considerations for potential resource-usage imbalances and potential performance imbalances. Adverse effects suffered by a hardware thread when accessing a resource and when the hardware thread is using a comparatively small portion of resource is generally an indication of a potential performance imbalance. Adverse effects suffered by a first hardware thread as a result of activities of a second hardware thread are also indications of a potential performance imbalance suffered by the first hardware thread. These situations may be manifested differently in different types of hardware resources. As also mentioned above, one or more control registers may be additionally provided to allow thresholds used in identifying potential performance imbalances to be dynamically adjusted.

Figure 16A:
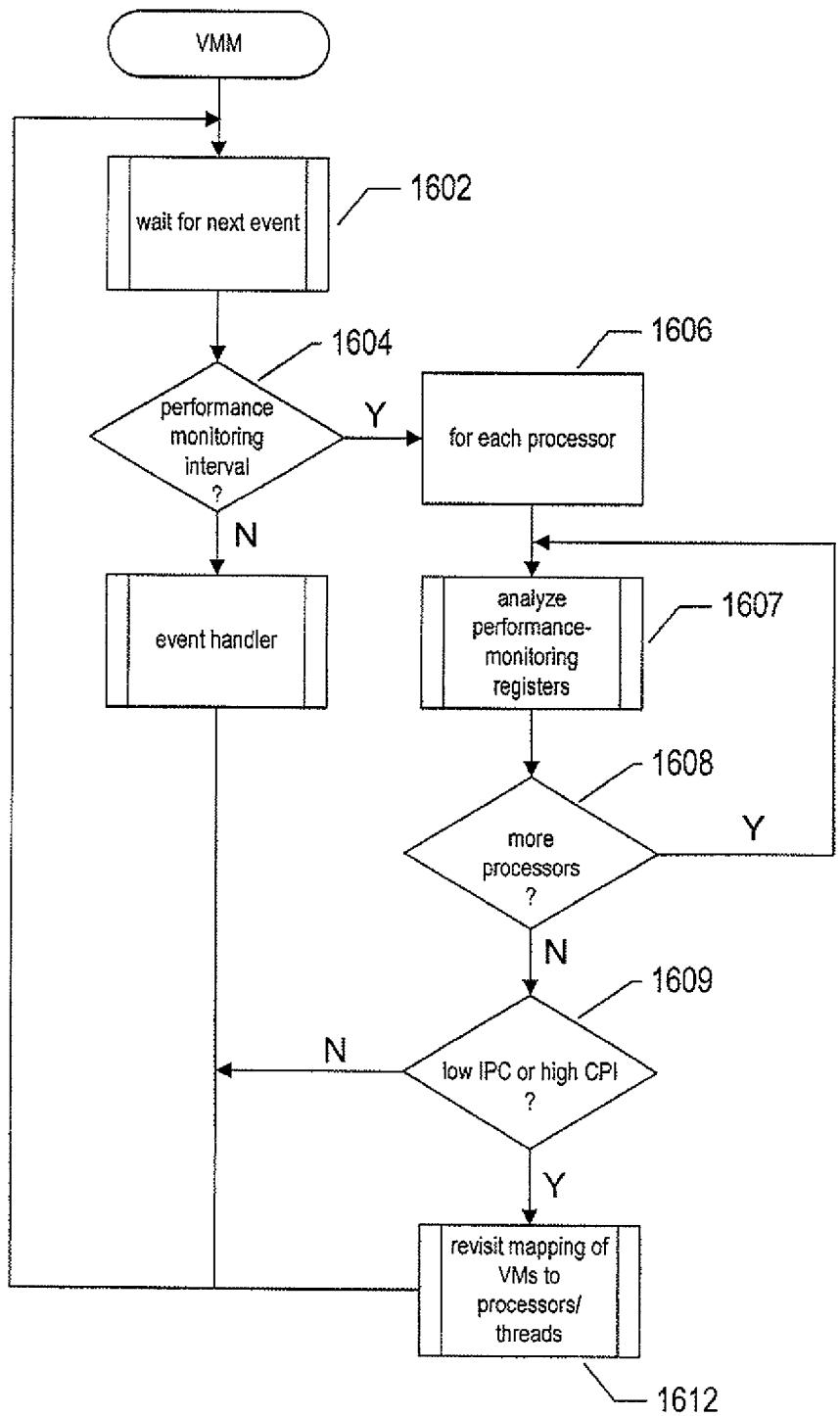
FIGS. 16A-B illustrate use of performance-imbalance-monitoring registers by a VMM.
Figure 16B:
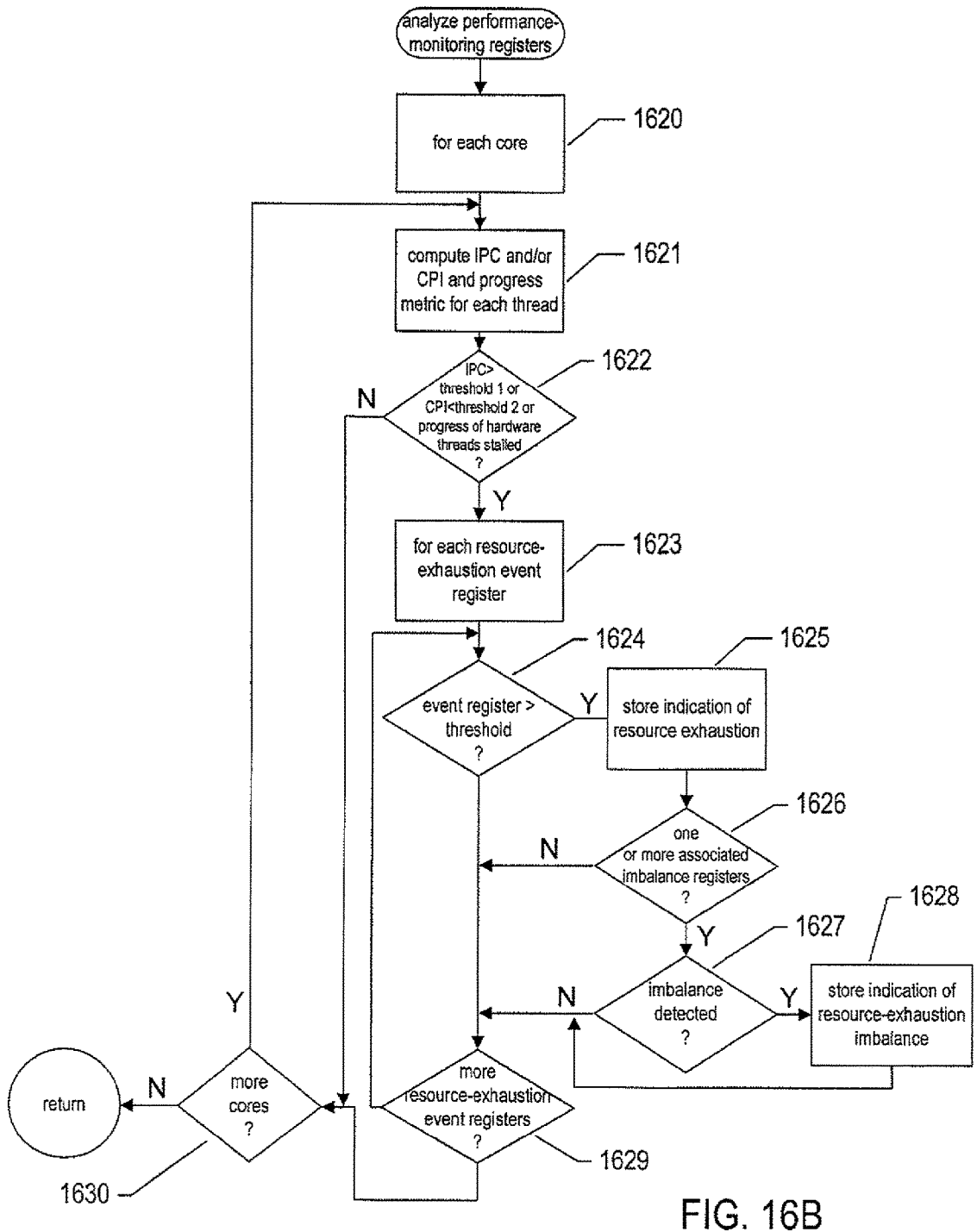

FIGS. 16A-B illustrate use of performance-imbalance-monitoring registers by a VMM. In step 1602, the VMM waits for a next event to occur. When the event is associated with a next performance monitoring interval, as determined in step 1604, then, in the for-loop of step 1606-1608, a performance-analysis routine is called, in step 1607, for each processor on which the VMM schedules VMs. When the performance analysis carried out in the for-loop of step 1606-1608 indicates a potential performance degradation, as determined in step 1609, then, in step 1612, the VMM carries out an analysis of the mapping of VMs to processors and hardware threads in order to potentially reschedule VM execution and remap VMs to processors and hardware threads to avoid potential conflicts indicated by the values in various performance-imbalance-monitoring registers.

FIG. 16B provides a control-flow diagram for the performance-analysis routine called in step 1607 of FIG. 16A. In the for-loop of step 1620-1630, a performance-analysis routine considers each processor or processor core on which the VMM schedules VMs for execution. In step 1621, the performance-analysis routine computes metrics for computational throughput as well as for progress for each VM executing on the processor or processor core currently considered in the for-loop of step 1620-1630. When the computed values in step 1621 indicate a potential performance-imbalance issue or progress degradation, such as progress degradation due to frequent stalling as a result of resource exhaustion, as determined in step 1622, then, in the for-loop of steps 1623-1629, the performance-analysis routine considers each resource-exhaustion-event register and associated performance-imbalance-monitoring register or registers. When the resource-exhaustion-event register has a value greater than a threshold value, as determined in step 1624, the performance-analysis routine stores an indication of chronic resource exhaustion, in step 1625, for subsequent use in VMM scheduling and mapping VMs to processors and threads. When the resource-exhaustion-event register is associated with one or more performance-imbalance-monitoring registers, as determined in step 1626, and when the one or more associated performance-imbalance-monitoring registers provide indications of potential performance imbalance, as determined in step 1627, then the performance analysis routine stores an indication of potential performance imbalance associated with resource exhaustion, in step 1628. The indication stored in steps 1625 and 1628 provide information needed by the VMM routine, called in step 1612 of FIG. 16A, to reconsider the mapping of VMs to processors, processor cores, and hardware threads in order to attempt to ameliorate conflicts among simultaneously executing hardware threads and the VMs mapped to those hardware threads.

Although the present invention has been described in terms of particular embodiments, it is not intended that the invention be limited to these embodiments. Modifications within the spirit of the invention will be apparent to those skilled in the art. For example, as discussed above, performance-imbalance-monitoring registers are provided within a processor in association with various components and resources that may suffer resource-exhaustion events. Performance-imbalance-monitoring registers accumulate counts of indications of potential performance imbalances due to imbalance in resource usage among simultaneously executing hardware threads. A separate performance-imbalance-monitoring register may be associated with a hardware resource for each of a maximum number of hardware threads that may simultaneously execute within a processor or processor core or, as indicated by the example of FIGS. 13A-J, when the maximum number of simultaneously executing hardware threads is 2, a single performance-imbalance-monitoring register may be used, with positive numbers indicating an imbalance associated with a first hardware thread and negative numbers indicating a potential performance imbalance associated with a second hardware thread. Many different types of criteria may be used, by a processor, to determine whether a potential performance imbalance is associated with any particular resource-exhaustion event. The examples illustrated in FIGS. 13A-J and FIGS. 14A-D illustrate a number of possible considerations with respect to particular types of hardware resources. However, many other types of considerations may be made during processor operation to detect potential performance imbalances. In general, a performance imbalance occurs when a hardware thread suffers as a result of resource exhaustion and when that hardware thread is either using less than its fair share of the resource or suffered the resource-exhaustion event as a result of an operation or access directed to the resource by another, simultaneously executing hardware thread. The performance-imbalance-monitoring registers can be implemented using any of many different types of register implementations compatible with the fabrication technologies employed to fabricate the processor into which the performance-imbalance-monitoring registers are included. The information stored in performance-imbalance-monitoring registers may additionally be used, as mentioned above, to more accurately measure the productive processor cycles used by a particular VM while the VM executes as a hardware thread on an SMT processor or SMT-processor core.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A performance-imbalance-monitoring register associated with a component or resource within a processor, the component or resource shared, or variably partitioned, among two or more hardware threads executing within the processor, the performance-imbalance-monitoring register comprising:
    a processor register that stores accumulated indications of potential performance imbalances that arise from contention for the component or resource by two or more of the hardware threads when one of the hardware threads contending for the component or resource is using less than a threshold portion of the component or resource and when a resource-exhaustion event associated with the component or resource, which may be recorded in a performance-monitoring register within the processor, has occurred to the detriment of the hardware thread using less than a threshold portion of the component or resource; and
    processor logic that detects a potential performance imbalance when handling the resource-exhaustion event and accordingly updates the processor register.

2. The performance-imbalance-monitoring register of claim 1 wherein the component or resource within the processor is also associated with a performance-monitoring register that accumulates indications of resource-exhaustion events associated with the component or resource.

3. The performance-imbalance-monitoring register of claim 1 wherein the processor logic detects a potential performance imbalance by determining that the hardware thread is using less than a threshold portion of the functionality provided by the component or resource.

4. The performance-imbalance-monitoring register of claim 1 wherein the processor logic detects a potential performance imbalance by determining that the hardware thread has experienced a resource-exhaustion event as a result of an operation or activity initiated by another hardware thread simultaneously executing within the processor.

5. The performance-imbalance-monitoring register of claim 1 wherein the performance-imbalance-monitoring register accumulates indications of potential performance imbalances that adversely impact a particular hardware thread.

6. The performance-imbalance-monitoring register of claim 1 wherein the performance-imbalance-monitoring register accumulates indications of potential performance imbalances that adversely impact each of two simultaneously executing hardware threads.

7. The performance-imbalance-monitoring register of claim 1 wherein the processor is one of:
   an SMT processor; and
   an SMT-processor core.

8. The performance-imbalance-monitoring register of claim 1 wherein the component or resources is one of:
   a queue;
   a reservation station;
   a memory cache;
   a translation-lookaside buffer;
   a return-stack buffer;
   a memory-load queue;
   a memory-store queue;
   an instruction decoder queue; and
   a reorder buffer.

9. A virtualization layer within a computer system that assigns each of two or more virtual machines to execute according to an execution schedule within a different one of two or more hardware threads within each of multiple processors, the virtualization layer comprising:
   a virtual-machine-monitor that virtualizes physical processors to create virtual processors on which each of the virtual machines executes, each physical processor including performance-monitoring and performance-imbalance-monitoring registers associated with components within the processor that are flexibly partitioned among, or shared by, the hardware threads, each performance-imbalance-monitoring register associated with a component or resource within a processor and storing accumulated indications of potential performance imbalances that arise from contention for the component or resource by two or more of the hardware threads when one of the hardware threads contending for the component or resource is using less than a threshold portion of the component or resource and when a resource-exhaustion event associated with the component or resource has occurred to the detriment of the hardware thread using less than a threshold portion of the component or resource;
   a kernel that manages memory, communications, and data-storage machine resources on behalf of executing virtual machines; and
   a scheduling component that that intermittently uses values in the performance-monitoring and performance-imbalance-monitoring registers to reassign virtual machines to hardware threads and reschedule execution of virtual machines in order to optimize computational throughput and performance of the virtual machines.

10. The virtualization layer of claim 9 wherein the scheduling component determines that the virtual machines in a first set of one or more of the two or more virtual machines simultaneously executing within hardware threads on a processor are experiencing a performance imbalance with respect to a second set of the two or more virtual machines simultaneously executing within the hardware threads on the processor by determining that performance-imbalance-monitoring registers associated with the virtual machines in the first set have accumulated numbers of performance-imbalance indications greater than a threshold number of performance-imbalance indications.

11. The virtualization layer of claim 9 wherein, when the scheduling component determines that the virtual machines in a first set of one or more of the two or more virtual machines simultaneously executing within hardware threads on a processor are experiencing a performance imbalance with respect to a second set of the two or more virtual machines simultaneously executing within the hardware threads on the processor, the scheduling component carries out one or more of:
   remapping the first and second sets of virtual machines to available hardware threads to avoid resource conflicts among virtual machines mapped to a common processor;
   remapping one or more of the virtual machines in the first and second sets of virtual machines to each execute alone on a processor; and
   rescheduling execution of one or more of the virtual machines in the first and second sets of virtual machines to avoid resource conflicts among virtual machines mapped to a common processor.

12. The virtualization layer of claim 9 wherein each performance-imbalance-monitoring register associated with a processor component comprises:
   a register that stores accumulated indications of potential performance imbalances that adversely impact a hardware thread due to a resource-exhaustion event associated with the component; and
   processor logic that detects a potential performance imbalance when handling the resource-exhaustion event and accordingly updates the register.

13. The virtualization layer of claim 9 wherein of claim 12 wherein the processor component is also associated with a performance-monitoring register that accumulates indications of resource-exhaustion events associated with the component or resource.

14. The virtualization layer of claim 9 wherein of claim 12 wherein the processor logic detects a potential performance imbalance by determining that the hardware thread is using less than a threshold portion of the functionality provided by the component.

15. The virtualization layer of claim 9 wherein of claim 12 wherein the processor logic detects a potential performance imbalance by determining that the hardware thread has experienced a resource-exhaustion event as a result of an operation or activity initiated by another hardware thread simultaneously executing within the processor.

16. The virtualization layer of claim 9 wherein of claim 12 wherein the performance-imbalance-monitoring register accumulates indications of potential performance imbalances that adversely impact a particular hardware thread.

17. The virtualization layer of claim 9 wherein of claim 12 wherein the performance-imbalance-monitoring register accumulates indications of potential performance imbalances that adversely impact each of two simultaneously executing hardware threads.

18. The virtualization layer of claim 9 wherein of claim 12 wherein the processor is one of:
   an SMT processor; and
   an SMT-processor core.

19. The virtualization layer of claim 9 wherein of claim 12 wherein the component is one of:
   a queue;
   a reservation station;
   a memory cache;
   a translation-lookaside buffer;
   a return-stack buffer;
   a memory-load queue;
   a memory-store queue;
   an instruction decoder queue; and
   a reorder buffer.

* * * * *